United States Patent
Aoyama et al.

(10) Patent No.: US 9,400,206 B2
(45) Date of Patent: Jul. 26, 2016

(54) WEIGHT DETECTION SENSOR AND VEHICLE SEAT APPARATUS INCLUDING PLURAL STRAIN DETECTION ELEMENTS

(71) Applicant: Aisin Seiki Kabushiki Kaisha, Kariya-shi (JP)

(72) Inventors: Mutsuro Aoyama, Nagoya (JP); Kan Ichihara, Kariya (JP); Hiroyuki Fujii, Kariya (JP); Kazumasa Seo, Nagakute (JP); Koji Washino, Anjo (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 198 days.

(21) Appl. No.: 14/227,168

(22) Filed: Mar. 27, 2014

(65) Prior Publication Data
US 2014/0338990 A1 Nov. 20, 2014

(30) Foreign Application Priority Data
May 14, 2013 (JP) ................. 2013-101979

(51) Int. Cl.
| *G01G 19/08* | (2006.01) |
| *B60R 21/015* | (2006.01) |
| *G01L 1/22* | (2006.01) |
| *B60N 2/00* | (2006.01) |
| *G01G 19/414* | (2006.01) |

(52) U.S. Cl.
CPC ............ *G01G 19/08* (2013.01); *B60N 2/002* (2013.01); *B60R 21/0152* (2014.10); *G01G 19/4142* (2013.01); *G01L 1/2206* (2013.01)

(58) Field of Classification Search
CPC ........ B60R 21/01512–21/01526; B60N 2/002; G01L 1/2206; G01G 19/4142; G01G 19/08
See application file for complete search history.

(56) References Cited

U.S. PATENT DOCUMENTS

| 5,823,278 | A * | 10/1998 | Geringer | G01G 19/445 177/144 |
| 6,583,367 | B2 * | 6/2003 | Wolfe | B60R 21/0155 177/136 |
| 6,670,560 | B2 * | 12/2003 | Curtis | B60N 2/015 177/144 |
| 6,928,889 | B2 * | 8/2005 | Kojima | G01G 19/4142 73/862.451 |
| 7,049,529 | B2 * | 5/2006 | Vogel | G01G 19/4142 177/144 |
| 7,055,365 | B2 * | 6/2006 | Yanagi | B60N 2/002 177/211 |
| 7,155,981 | B2 | 1/2007 | Matsuura et al. | |
| 7,189,931 | B2 * | 3/2007 | Hida | B60N 2/002 177/144 |
| 7,487,687 | B2 * | 2/2009 | Sumi | B60N 2/002 73/862.391 |
| 7,490,523 | B2 * | 2/2009 | Sakamoto | B60N 2/002 73/862.391 |

(Continued)

FOREIGN PATENT DOCUMENTS

JP 2003-83707 3/2003

*Primary Examiner* — Randy W Gibson
(74) *Attorney, Agent, or Firm* — Oblon, McClelland, Maier & Neustadt, L.L.P

(57) ABSTRACT

A weight detection sensor disposed in a fixing unit fixing a seat side fixing member to a floor side fixed member and measuring a load of a passenger sitting in the seat, includes: a strain body fixed to both end portions of a mounting surface formed on one of the floor side fixed member and the seat side fixing member and arranged in the fixing unit; a connection member fixed to a central portion of the strain body in a vertical direction and fixed to the other one of the floor side fixed member and the seat side fixing member; a strain detection element unit including first to fourth strain detection elements; and a Wheatstone bridge circuit where the first and third strain detection elements are arranged on sides facing each other and the second and fourth strain detection elements are arranged on sides facing each other.

6 Claims, 15 Drawing Sheets

(56) References Cited

U.S. PATENT DOCUMENTS

| | | | | |
|---|---|---|---|---|
| 7,509,871 B2* | 3/2009 | Nakano | B60N 2/002 | |
| | | | 73/781 | |
| 7,555,960 B2* | 7/2009 | Nakano | B60N 2/002 | |
| | | | 73/781 | |
| 7,712,374 B2* | 5/2010 | Kawabata | G01L 1/2206 | |
| | | | 73/781 | |
| 8,258,413 B2* | 9/2012 | Ito | G01G 3/1402 | |
| | | | 177/136 | |
| 9,021,888 B2* | 5/2015 | Takuma | G01L 1/2206 | |
| | | | 73/855 | |
| 2004/0231435 A1* | 11/2004 | Kobata | G01G 19/4142 | |
| | | | 73/862.381 | |
| 2008/0156103 A1* | 7/2008 | Nakano | G01G 19/4142 | |
| | | | 73/781 | |
| 2009/0126500 A1* | 5/2009 | Ito | G01L 1/2231 | |
| | | | 73/781 | |

* cited by examiner

WEIGHT DETECTION SENSOR AND VEHICLE SEAT APPARATUS INCLUDING PLURAL STRAIN DETECTION ELEMENTS

CROSS REFERENCE TO RELATED APPLICATIONS

This application is based on and claims priority under 35 U.S.C. §119 to Japanese Patent Application 2013-101979, filed on May 14, 2013, the entire contents of which are incorporated herein by reference.

TECHNICAL FIELD

This disclosure relates to a weight detection sensor for a vehicle seat apparatus that accurately detects a passenger sitting in a vehicle seat.

BACKGROUND DISCUSSION

In the related art, techniques for controlling operations of various safety devices according to a weight of a passenger sitting in a seat are known to improve performances of the safety devices equipped in a vehicle such as seat belts and airbags. For example, it is general that a warning light of "Fasten Seat Belt" is displayed after a detection of the sitting when the passenger sits in the seat but does not fasten the seat belt. In addition, according to regulations in practice in North America, the airbag has to be deployed in case of an accident in a case where an adult sits in an assistant driver's seat. In this manner, it is very important, in terms of safety, to detect and accurately determine the weight of the passenger.

As an example of the related art, JP 2003-83707A (Reference 1) discloses a strain sensor that includes a sensor substrate (strain body) which has two fixed holes fixed to respective members disposed in both end portions of a long plate, a detection hole arranged between the two fixed holes to be fixed to the other member, and at least one strain detection element adhered to an upper surface of the long plate between the fixed hole and the detection hole, the strain sensor further including a fixing member that is press-fitted into each of the fixed holes of the sensor substrate, and a detection member (connection member) that is press-fitted into the detection hole of the sensor substrate. An external force is applied to the end portion of the detection member abutting against the sensor substrate and a reaction force is applied to the end portion of the two fixing members abutting against the sensor substrate, and a strain is detected by using the strain detection element adhered to the sensor substrate based on the external force and the reaction force.

In the strain sensor according to JP 2003-83707A (Reference 1), a plurality of strain detection elements are arranged in parallel on a central straight line in a longitudinal direction of the sensor substrate (strain body). These strain detection elements can detect a load value or the like by using the strain caused by pulling and compression with respect to one direction (direction parallel with a gauge length). Accordingly, in a case where a load of the passenger in an up-down direction added to the vehicle seat is transmitted to the sensor substrate, the weight of the passenger can be detected by using the strain of the strain detection element arranged in the sensor substrate when the strain sensor according to JP 2003-83707A (Reference 1) is interposed between the vehicle seat and a floor side fixed member, the detection hole is connected to a seat frame (seat side fixing member), and the fixed hole is connected to the floor side fixed member.

However, in a case where the passenger sits in the seat, a hip point where the weight of the passenger is applied is separated from a position of the seat frame where the sensor substrate is arranged, and thus the seat frame that extends horizontally in a left-right direction of the vehicle is subjected to bending. Between the seat side fixing member (member of the seat frame extending in a front-back direction) corresponding to both of the end portions of the seat frame and the floor side fixed member, the bending results in a relative angular displacement for which the seat side fixing member that extends in the front-back direction with respect to the floor side fixed member is directed to collapse inside in a vehicle width direction. Accordingly, a load error directed for the collapse to a seat frame side (inside) in the left-right direction which is bent is generated in the sensor substrate that detects the load of the passenger as a load generated in the up-down direction. The load error directed for the collapse inside in the vehicle width direction caused by the seating load affects the strain detection element of the sensor substrate, and thus the weight of the passenger may not be accurately detected.

In addition, although being rigid rectangular bodies, the floor side fixed member where the sensor substrate is arranged and the seat frame tend to be elastically deformed (refer to FIG. 15) such that a front side and a back side of the vehicle floor are relatively twisted in opposite directions about a central axis OW extending in the left-right direction through a center of the seat frame in the front-back direction in a case where a biased external force is applied to the vehicle, through a sudden braking or the like, to deform the floor side fixed member and the seat frame in addition to the load of the passenger in the up-down direction. When a moment load is applied in the floor side fixed member and the seat frame in this manner to relatively twist the right side and the left side in opposite directions about the central axis OW extending in the left-right direction, the relative angular displacement may be generated about the central axis OW extending in the left-right direction between the floor side fixed member and the seat frame. The relative angular displacement affects the strain of the strain detection element that performs the weight detection, and thus the weight of the passenger may not be accurately detected.

Accordingly, in the related art, a weight detection sensor in which the strain detection element toward the sensor substrate is connected to a Wheatstone bridge circuit as a variable resistor and, as illustrated in FIG. 32, two strain detection element units SU having first to fourth strain detection elements SG1 to SG4 each are arranged in strain bodies 20 arranged at four sites FL, RL, FR, and RR in a front, back, left, and right of an upper rail of the one vehicle seat is used such that the effect of the load errors caused by the two types of the relative angular displacement can be cancelled by the first to fourth strain detection elements SG1 to SG4 of the eight strain detection element units SU and only the weight of the passenger can be accurately detected.

However, it is desired that the weight detection sensor be capable of having a reduced number of components and reduced manufacturing costs, in addition to accurately detecting the load of the passenger, without being subjected to the effect of the load error caused by the relative angular displacement between the floor side fixed member and the seat frame.

SUMMARY

Thus, a need exists for a weight detection sensor which is not suspectable to the drawback mentioned above.

An aspect of this disclosure is directed to a weight detection sensor for a vehicle seat apparatus disposed in a fixing unit that fixes a seat side fixing member which fixes a vehicle seat to a floor side fixed member which is fixed to a vehicle floor at four front, back, left, and right sites of the vehicle seat and measuring a load of a passenger sitting in the vehicle seat, including a strain body that is fixed to both end portions of a mounting surface formed on one of the floor side fixed member and the seat side fixing member and arranged in the fixing unit on a front side and a back side of the vehicle seat at a predetermined distance from the mounting surface, the strain body extending in a front-back direction of the vehicle seat, a connection member that is fixed to a central portion of the strain body in a vertical direction and is fixed to the other one of the floor side fixed member and the seat side fixing member, a strain detection element unit that includes a first strain detection element and a third strain detection element arranged on opposite sides across a front-back direction center line of the strain body at positions where a compressive strain is generated on an outer surface of the strain body between a first end portion and the central portion of the strain body when a weight of the passenger is applied, and a second strain detection element and a fourth strain detection element arranged on opposite sides across the front-back direction center line of the strain body at positions where a tensile strain is generated on the outer surface of the strain body between the first end portion and the central portion of the strain body when the weight of the passenger is applied, and a Wheatstone bridge circuit where the first strain detection element and the third strain detection element are arranged on sides facing each other and the second strain detection element and the fourth strain detection element are arranged on sides facing each other, each of the strain detection elements being a variable resistor, in which the strain detection element units are arranged in a pair in at least a front and a back or a left and a right of the vehicle seat and the first end portions forming the pair are arranged at symmetrical positions in the directions forming the pair.

According to the aspect of this disclosure, the first strain detection element and the third strain detection element are arranged at the position where the compressive strain is generated between the one first end portion (first end portion on the front side) of the strain body on the mounting surface of the fixing unit on the front side and the central portion and the second strain detection element and the fourth strain detection element are arranged at the position where the tensile strain is generated in the strain detection element units when the weight of the passenger is applied, and the first strain detection element and the third strain detection element are arranged at the position where the compressive strain is generated between the other first end portion (first end portion on the back side) of the strain body on the mounting surface of the fixing unit on the back side and the central portion and the second strain detection element and the fourth strain detection element are arranged at the position where the tensile strain is generated. The strain detection element units form a pair in at least one of the front-back and left-right directions of the vehicle seat, and the first end portions forming the pair are arranged at the symmetrical positions.

Since the strain detection element units are arranged in pair in at least one of the front-back and left-right directions of the vehicle and are arranged at the symmetrical positions, the corresponding strain detection elements of the strain bodies at the symmetrical positions (for example, the first strain detection elements or the third strain detection elements corresponding to the first strain detection elements) generate the strain errors in the opposite directions when the relative angular displacement directed for the collapse inside of the seat side fixing member extending in the front-back direction with respect to the floor side fixed member works or when the relative angular displacement directed for the twist in the opposite directions works in one direction about the central axis extending in the left-right direction between the seat side fixing member and the floor side fixed member. In this manner, the strain errors can be cancelled when the detected strains are added.

For example, the hip point to which the weight of the passenger is applied is separated from the position of the floor side fixed member where the sensor substrate is arranged in a case where the passenger sits in the seat, and thus the load error for the collapse directed inside in the vehicle width direction is generated in each of the sensor substrates by the bending of the seat side fixing member which extends in the left-right and horizontal directions. Even in this case, a strain force for the collapse inside in the vehicle width direction is added to the strain detection elements (for example, the first strain detection elements on the right side) arranged on the right side of the strain detection element unit and the strain detection elements (for example, the first strain detection elements on the left side) arranged on the left side that are at the symmetrical positions if the strain detection element units are arranged in pair in the left and the right of the vehicle and at the symmetrical positions, and thus the strain error is generated in the opposite directions in the corresponding strain detection elements of the left and right strain detection element units. For example, when the first strain detection element on the right side generating the compressive strain by the load of the passenger in the up-down direction generates a further compressive strain by the load error, the first strain detection element on the left side generates the tensile strain to reduce the compressive strain, and thus the strain errors generated in the left and right strain detection elements can be cancelled.

In addition, the relative angular displacement is in the opposite directions in the left and the right of the vehicle seat between the seat side fixing member and the floor side fixed member when a large force is generated in the vehicle due to the sudden braking or the like and the relative angular displacement generating the load error directed for the twist in the opposite directions works in one direction between the seat side fixing member and the floor side fixed member about the central axis extending in the left-right direction. Accordingly, regarding the strain detection element units that are arranged at the symmetrical positions in the left and the right, the strain detection elements arranged on the right side and the strain detection elements arranged on the left side that correspond to each other (for example, the first strain detection elements) generate the strain error in the opposite directions, and thus the strain error can be cancelled as described above. In addition, regarding the strain detection element units that are arranged at the symmetrical positions in the front and the back of the vehicle seat, the strain detection element arranged on the front side and the strain detection element arranged on the back side that correspond to each other (for example, the first strain detection elements) generate the strain error in the opposite directions, and thus the strain error can be cancelled as described above.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Embodiment 1

Hereinafter, a first embodiment of a weight detection sensor 10 of a vehicle seat apparatus disclosed here will be described with reference to the accompanying drawings. "Front-back, left-right, and up-down" directions used in this specification refer to respective directions of a vehicle viewed from a passenger sitting in a vehicle seat apparatus 100. In addition, in this embodiment, the vehicle is a left-hand drive vehicle, and the presence or absence of the passenger sitting in an assistant driver's seat is determined.

Figure 1:
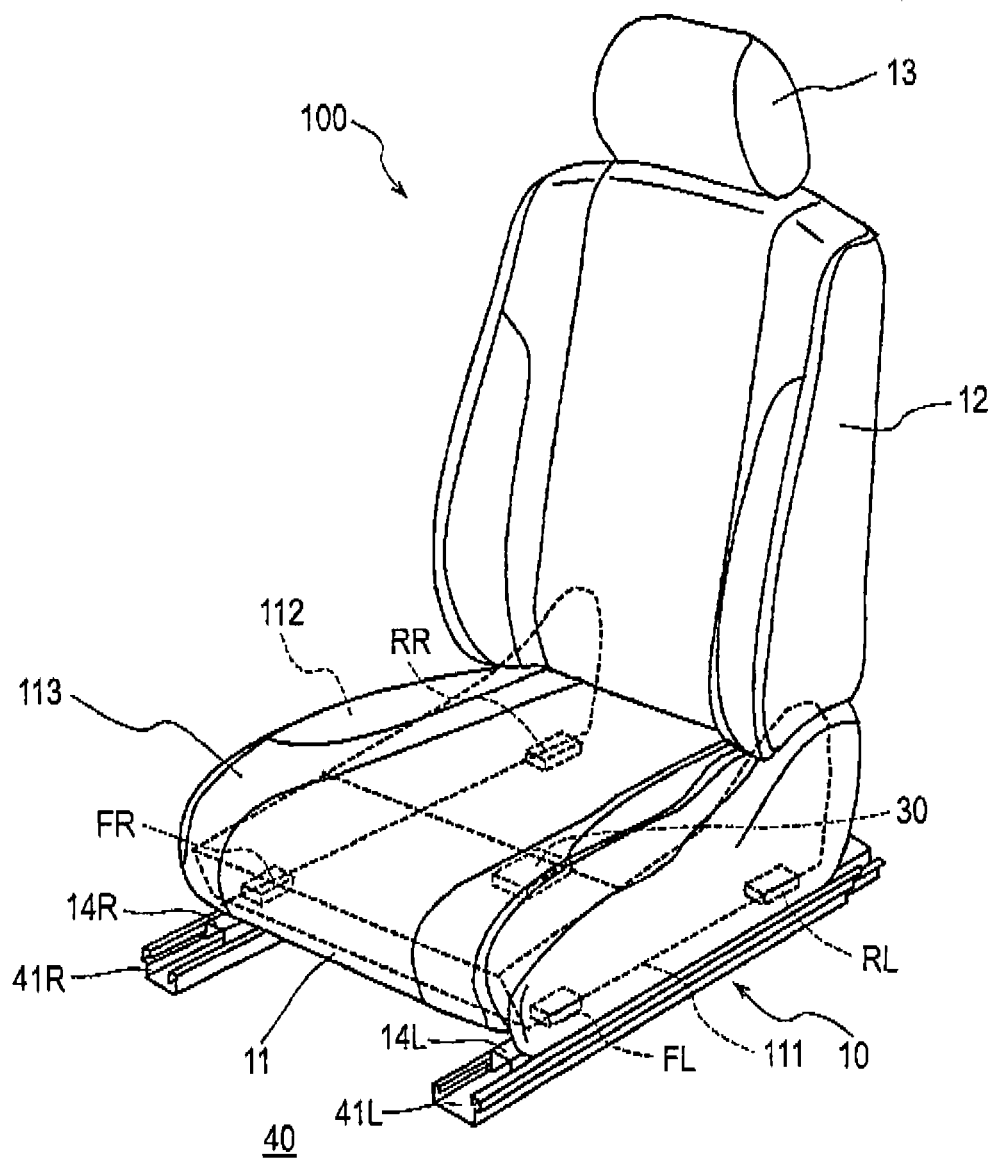
FIG. 1 is a diagram illustrating a first embodiment in which a weight detection sensor is arranged in a seat cushion.

As illustrated in FIG. 1, the vehicle seat apparatus 100 for the assistant driver's seat includes a seat cushion (corresponding to a vehicle seat) 11 on which the passenger sits, and a seat back 12, which is a backrest for the passenger, mounted on a back end portion of the seat cushion 11 to be pivotable in the front-back direction. In addition, a headrest 13 that supports the head of the passenger is mounted on an upper end of the seat back 12.

The seat cushion 11 has a seat frame (corresponding to a seat side fixing member) 17, a pad member 112 that is arranged on the seat frame 17, and an outer skin 113 that covers an outer surface of the pad member 112. A pair of left and right upper rails (corresponding to floor side fixed members) 14R and 14L are mounted on a lower surface of the seat frame 17. A front side (corresponding to a front side of the vehicle seat) and a back side (corresponding to a back side of the vehicle seat) of the left side of the seat frame 17 are mounted via a weight detection sensor (strain body, described later) disposed on a mounting surface 18 disposed on a front side FL upper surface and a back side RL upper surface of the left side upper rail 14L. A front side (corresponding to the front side of the vehicle seat) and a back side (corresponding to the back side of the vehicle seat) of the right side of the seat frame 17 are mounted on a front side FR upper surface and a back side RR upper surface of the right side upper rail 14R by bolts and nuts (not shown) via a bracket (not shown). The front side and the back side of the left side of the seat frame 17, the front side FL upper surface (mounting surface 18 (refer to FIG. 2)) and the back side RL upper surface (mounting surface 18) of the left side upper rail 14L corresponding to the front side and the back side of the left side, the front side and the back side of the right side of the seat frame 17, and the front side FR upper surface and the back side RR upper surface of the right side upper rail 14R corresponding to the front side and the back side of the right side constitute four fixing units. The upper rails 14R and 14L are respectively engaged on a pair of lower rails 15R and 15L that are fixed on a vehicle floor 8 to be movable in the front-back direction. In this manner, the vehicle seat apparatus 100 can be moved in the front-back direction on the vehicle floor 8 and can be fixed to a position desired by the passenger.

Figure 6A:
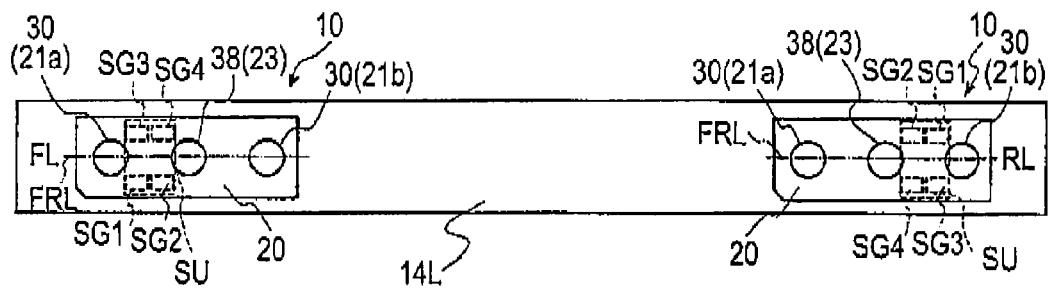
FIG. 6A is a diagram illustrating a state where each of strain detection elements is adhered to a strain body of the weight detection sensor.

Next, the weight detection sensor 10 will be described. Firstly, a case where a strain detection element unit SU (described later) is arranged in a front side end portion (first lower bracket 21a) of a strain body 20 on a front side FL and the strain detection element unit SU is arranged in a back side end portion (second lower bracket 21b) of a strain body 20 on a back side RL as illustrated in FIG. 6A will be described with the strain bodies 20 being arranged in a front and back of the left side upper rail 14L.

Figure 2:
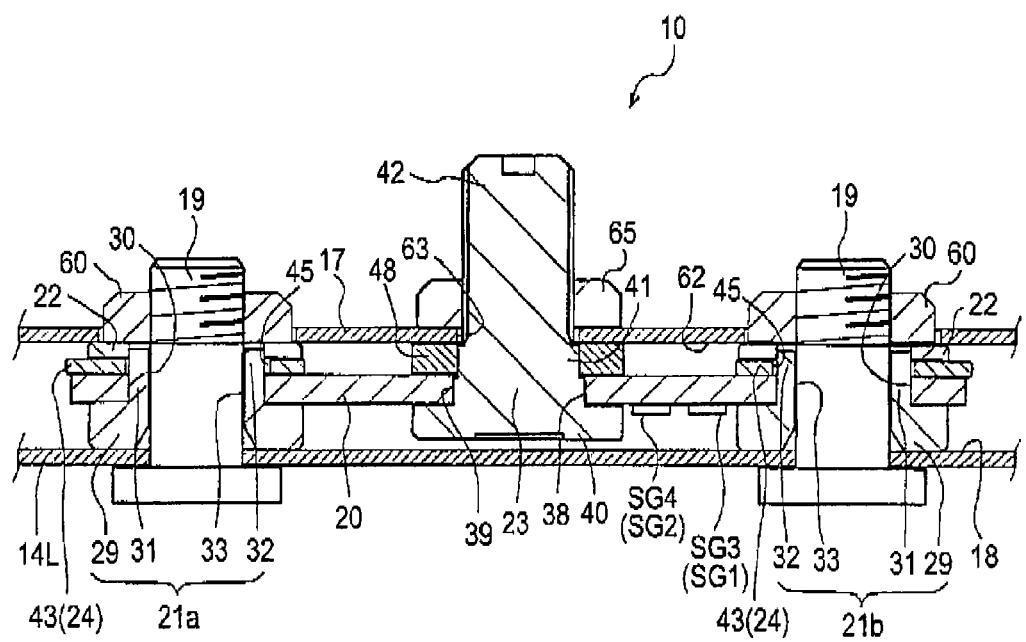
FIG. 2 is a sectional diagram of the weight detection sensor that is assembled between a seat frame and an upper rail.

The weight detection sensor 10 that is mounted on the front side FL upper surface of the left side upper rail 14L and the weight detection sensor 10 that is mounted on the back side RL upper surface have similar structures and only mounting positions of the strain detection element units SU with respect to the strain bodies 20 are different from each other. For example, in FIG. 6A, the weight detection sensor 10 that is mounted on the mounting surface 18 on the back side RL upper surface of the left side upper rail 14L will be mainly described. The weight detection sensor 10 is configured to have the plate-shaped strain body 20 having a substantially rectangular shape, first to fourth strain detection elements SG1 to SG4 that are attached to a rear surface of the strain body 20 as illustrated in FIGS. 2 to 4, the first and second lower brackets 21a and 21b that fix both end portions of the strain body 20 to the mounting surface 18 of the left side upper rail 14L such that the strain body 20 extends in the front-back direction, a connection member 23 that is fixed, in a vertical direction, to a central portion of the strain body 20 and is fixed to the seat frame 17, an upper bracket 24 having both end portions engaged with an upper surface of the strain body 20, an amplifier substrate (not shown) that amplifies a signal from each of the strain detection elements SG1 to SG4, an amplifier case 27 in which the amplifier substrate is accommodated, a flexible printed circuits (FPC) substrate 28 that is connected each of the strain detection elements SG1 to SG4 and the amplifier substrate, and the like.

Figure 3:
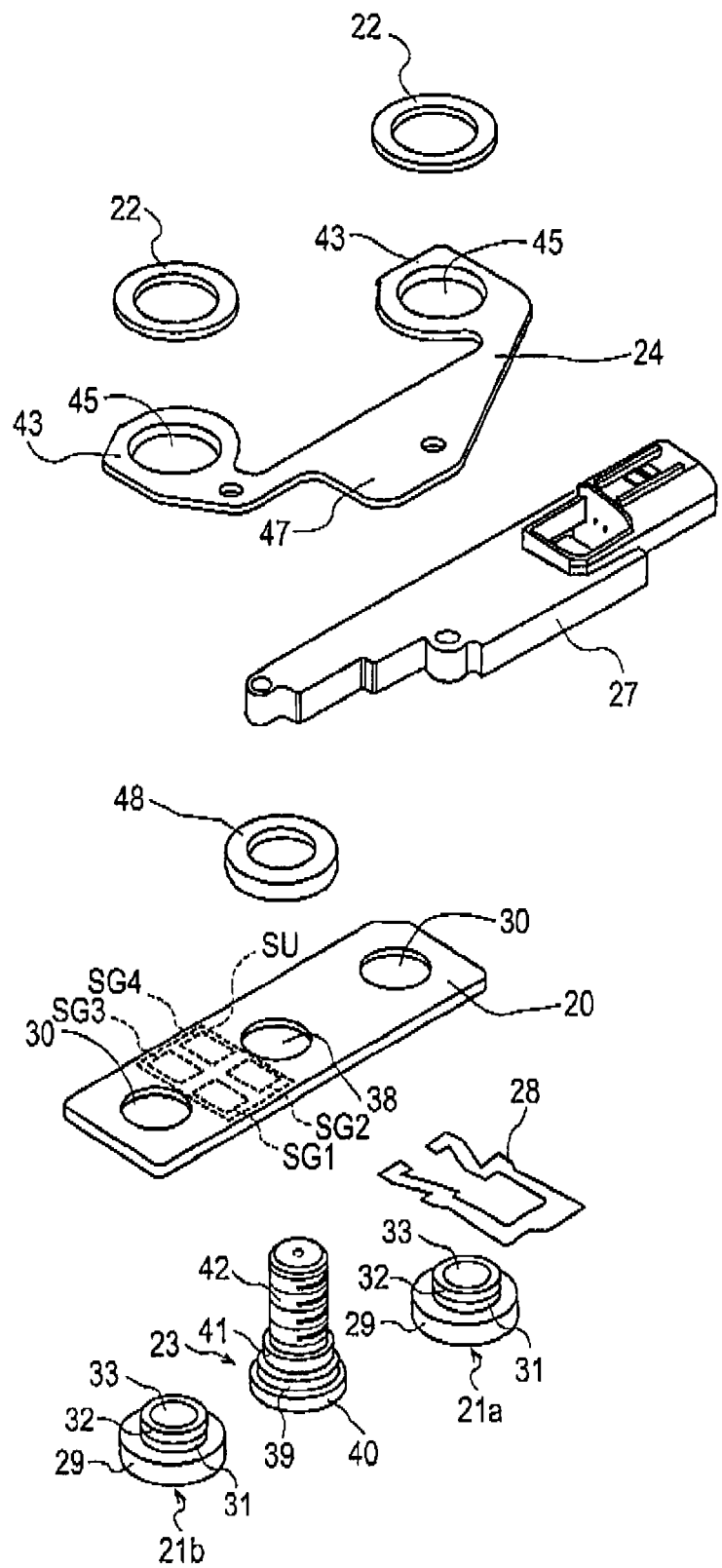
FIG. 3 is an exploded perspective diagram of the weight detection sensor.
Figure 4:
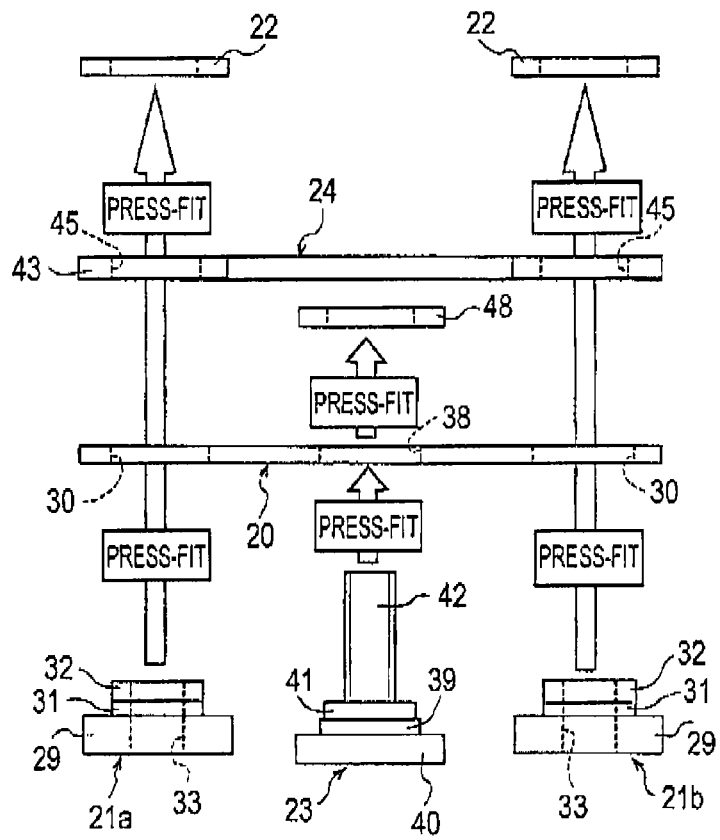
FIG. 4 is a diagram illustrating an assembled state of the weight detection sensor.

As illustrated in FIGS. 3 and 4, each of the first and second lower brackets 21a and 21b has a base portion 29 that has a predetermined thickness, a middle shaft portion 31 that projects from the base portion 29 and is press-fitted into a fixing hole 30 (described later) which is bored on both end sides of the strain body 20, a tip shaft portion 32 that projects from the middle shaft portion 31, and an insertion hole 33 that is bored to penetrate a center of each of the first and second lower brackets 21a and 21b.

The fixing holes 30 are formed in both of the end portions of the strain body 20, and both of the fixing holes 30 are bored apart from each other by a predetermined distance that is equal to a gap between fixed shafts 19 which project from both end portions of the left side upper rail 14L. As illustrated in FIG. 4, the middle shaft portion 31 is press-fitted into the fixing hole 30 (may not be press-fitted) until an outer surface of the strain body 20 abuts against the base portions 29 of the first and second lower brackets 21a and 21b. A central hole 38 is bored in the central portion of the strain body 20, and a middle shaft portion 39 of the connection member 23 is press-fitted into the central hole 38. A flange 40 with a thickness smaller than a thickness of the base portion 29 of the first and second lower brackets 21a and 21b is formed in a base end portion of the connection member 23 to abut against the outer surface of the strain body 20. In addition, a tip middle shaft portion 41 projects from the end surface of the middle shaft portion (connection member 23) 39, and a fixing screw portion 42 projects from an end surface of the tip middle shaft portion 41. The tip middle shaft portion 41 is press-fitted into a center bracket 48 in a state where the middle shaft portion 39 of the connection member 23 is press-fitted into the central hole 38 of the strain body 20 such that the base end portion of the connection member 23 is fixed to the strain body 20 with the strain body 20 being clamped between the flange 40 and the center bracket 48.

In addition, a tip end portion of the connection member 23 is connected to the vehicle seat apparatus 100 as follows. A connection surface 62 is formed on a rear side of the seat frame 17 of the vehicle seat apparatus 100, and a connection hole 63 is bored in the connection surface 62 (refer to FIG. 2). The connection surface 62 abuts against an upper surface of the center bracket 48 when the connection hole 63 of the seat frame 17 is fitted into the fixing screw portion 42 of the connection member 23. In this manner, the seat frame 17 is placed on the upper rail 14L via the strain body 20. When a nut 65 that is screwed into the fixing screw portion 42 is tightened, the connection surface 62 is pressure-bonded to the upper surface of the center bracket 48, and the connection member 23 of the weight detection sensor 10 is fixed to the seat frame 17.

In addition, as illustrated in FIG. 3, the upper bracket 24 that is made of steel or the like is assembled in both end portions of the upper surface of the strain body 20. Mounting portions 43 are integrally disposed in both end portions of the upper bracket 24, and mounting holes 45 are bored in the respective mounting portions 43 as illustrated in FIG. 3. The tip shaft portions 32 of the first and second lower brackets 21a and 21b that project from the upper surface of the strain body 20 are inserted into the respective mounting holes 45, and washer members 22 are respectively press-fitted into the tip shaft portions 32 of the first and second lower brackets 21a and 21b that project from the upper bracket 24. An amplifier case mounting portion 47 that integrally connects the mounting portions 43 at both ends with each other is formed in the upper bracket 24 to extend sideways from the strain body 20 as illustrated in FIG. 3.

Both of the end portions of the strain body 20 are pinched, along with the upper bracket 24, between the washer member 22 and the base portions 29 of the first and second lower brackets 21a and 21b.

As illustrated in FIG. 2, the insertion holes 33 of the first and second lower brackets 21a and 21b are fitted into the fixed shafts 19 that project in the vertical direction in the end portions of the left side upper rail 14L, and bottom surfaces of the base portions 29 sit on the mounting surface 18. When a fastening nut 60 that is screwed into a threaded portion which is engraved at a tip end of the fixed shaft 19 is tightened, the mounting portion 43 of the upper bracket 24 is pressed. In this manner, both of the end portions of the strain body 20 of the weight detection sensor 10 are fixed to the mounting surface 18 of the left side upper rail 14L at a predetermined distance, which is equal to the thickness of the base portion 29, from the mounting surface 18.

Figure 8:
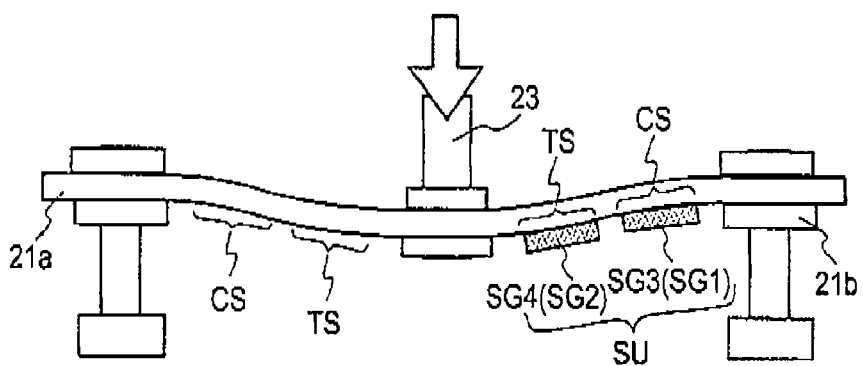
FIG. 8 is a diagram illustrating a normal deformation state of the strain body on a back side of FIG. 6A in a case where the load from the up-down direction is applied by the weight of the passenger.

The strain body 20, the central portion of which is fixed to the seat frame 17 via the connection member 23 and both of the end portions of which are fixed to the left side upper rail 14L as described above, is bent with both of the end portions thereof being supported by the first and second lower brackets 21a and 21b as illustrated in FIG. 8 when a load of the passenger sitting on the seat cushion 11 is added to the strain body 20 via the connection member 23.

When the bending occurs, a compressive strain is generated in the rear surface on first and second lower bracket 21a and 21b sides (compressive strain generation positions CS) and a tensile strain is generated in the rear surface on connection member 23 sides (tensile strain generation positions TS) (refer to FIGS. 7 and 8) on the outer surface of the strain body 20, in proportion to the load applied by a weight of the passenger, between the first lower bracket (corresponding to a first end portion on the front side) 21a and the connection member (corresponding to the central portion) 23 and between the second lower bracket (corresponding to a first end portion on the back side) 21b and the connection member 23.

As illustrated in FIGS. 6A and 8, in the strain body 20 that is mounted on the mounting surface 18 on the back side RL, the first strain detection element SG1 and the third strain detection element SG3 are adhered, so as to detect the strains, to the second lower bracket 21b side (compressive strain generation positions CS) where the compressive strain is generated in the rear surface of the strain body 20 between the second lower bracket 21b and the connection member 23 when the weight of the passenger is applied as described above. In addition, the second strain detection element SG2 and the fourth strain detection element SG4 are adhered to the connection member 23 side (tensile strain generation positions TS) where the tensile strain is generated in the rear surface of the strain body 20 between the second lower bracket 21b and the connection member 23 when the weight of the passenger is applied.

The first strain detection element SG1 and the third strain detection element SG3 are adhered such that the first strain detection element SG1 is arranged outside (upper side in FIG. 6A) across a front-back direction center line FRL of the strain body 20 and the third strain detection element SG3 is arranged (corresponding to the opposite side) inside (lower side in FIG. 6A) across the front-back direction center line FRL on the back side RL of the left side upper rail 14L. The second strain detection element SG2 and the fourth strain detection element SG4 are adhered such that the second strain detection element SG2 is arranged outside (upper side in FIG. 6A) across the front-back direction center line FRL and the fourth strain detection element SG4 is arranged (corresponding to the opposite side) inside (lower side in FIG. 6A) across the front-back direction center line FRL.

The first to fourth strain detection elements SG1 to SG4 constitute the strain detection element unit SU. A tensile deformation and a compressive deformation in the front-back direction in which the strain body 20 extends are detected as expansion and contraction of the strain detection element itself by the first to fourth strain detection elements SG1 to SG4 and, at the same time, the first to fourth strain detection elements SG1 to SG4 work as variable resistors of a Wheatstone bridge circuit (described later) as an electrical resistance proportional to the expansion and contraction.

Figure 7:
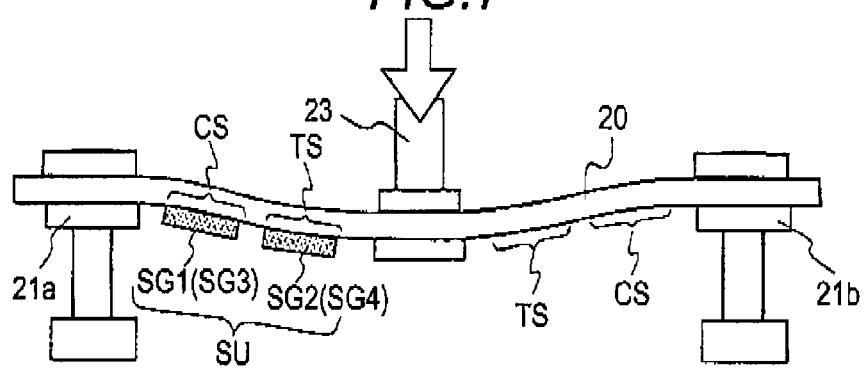
FIG. 7 is a diagram illustrating a normal deformation state of the strain body on a front side of FIG. 6A in a case where a load from an up-down direction is applied by a weight of a passenger.

In addition, the first strain detection element SG1 and the third strain detection element SG3 of the strain detection element unit SU are adhered to a first lower bracket 21a side (compressive strain generation positions CS), where the compressive strain is generated in the rear surface of the strain body 20 when the weight of the passenger is applied as illustrated in FIGS. 6A and 7, between the first end portion (first lower bracket 21a) on the front side and the central portion (connection member 23) in the strain body 20 that is mounted on the mounting surface 18 on the front side FL of the left side upper rail 14L. In addition, the strain detection element unit SU is arranged such that the second strain detection element SG2 and the fourth strain detection element SG4 are adhered to the connection member 23 side (tensile strain generation positions TS), where the tensile strain is generated in the rear surface of the strain body 20 when the weight of the passenger is applied, between the first end portion (first lower bracket 21a) on the front side and the central portion (connection member 23) (corresponding to the same side).

Figure 9:
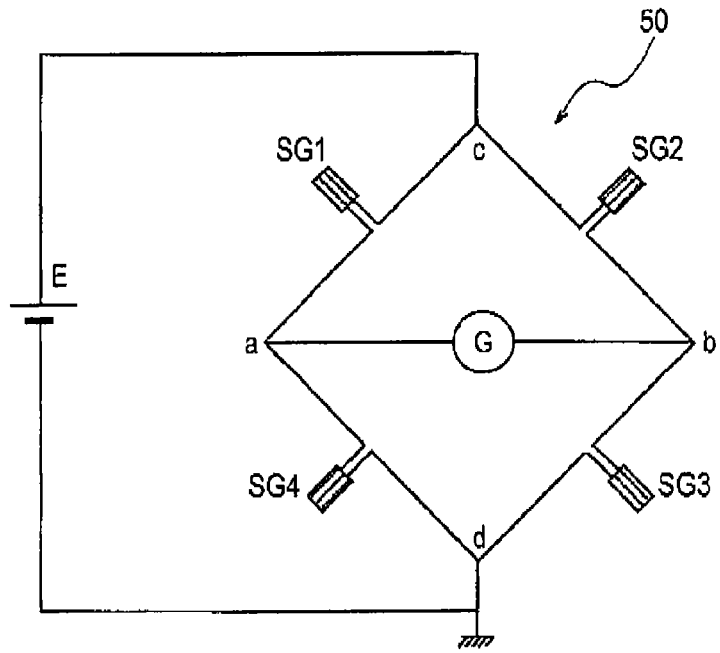
FIG. 9 is a diagram illustrating a Wheatstone bridge circuit to which each of the strain detection elements is connected as a variable resistor.

In addition, the first strain detection element SG1 to the fourth strain detection element SG4 constitute the variable resistors of a Wheatstone bridge circuit 50 as illustrated in FIG. 9. The first strain detection element SG1 is arranged between sides a and c of the Wheatstone bridge circuit 50, and the third strain detection element SG3 is arranged between sides b and d that face the sides a and c. The second strain detection element SG2 is arranged between the sides b and c of the Wheatstone bridge circuit 50, and the fourth strain detection element SG4 is arranged between the sides a and d that face the sides b and c. In this manner, a full bridge that has the first to fourth strain detection elements SG1 to SG4 as the variable resistors is constituted along with the FPC substrate 28 (described later) on the rear surface of the strain body 20, and the load of the passenger sitting on the seat cushion 11 is measured as the bending of the strain body 20.

As illustrated in FIG. 3, the amplifier case 27 made of a polybutylene terephthalate (PBT) resin or the like is mounted, by using a screw (not shown) and in parallel with the strain body 20, on the amplifier case mounting portion 47 of the upper bracket 24. Since made of the PBT resin, the amplifier case 27 can be reduced in weight and cost compared to an aluminum case of the related art. In addition, a connector (not shown) is disposed in the amplifier case 27 to connect a communication line through which an output of the amplifier substrate is transmitted to an electronic control unit (not shown).

In addition, as illustrated in FIG. 3, tip ends of both leg portions of the FPC substrate 28 that has a U shape are connected to the first to fourth strain detection elements SG1 to SG4 between the first end portion on the front side of the strain body 20 and the central portion (or between the first end portion on the back side and the central portion). As described above, these strain detection elements constitute the variable resistors of the Wheatstone bridge circuit 50, and a wiring part of the FPC substrate 28 constitutes wiring connecting the variable resistors of the Wheatstone bridge circuit 50 with each other. A U-shaped central part (corresponding to between a and b of the Wheatstone bridge circuit) of the FPC substrate 28 is connected to an amplifier circuit of the amplifier substrate.

Figure 5:
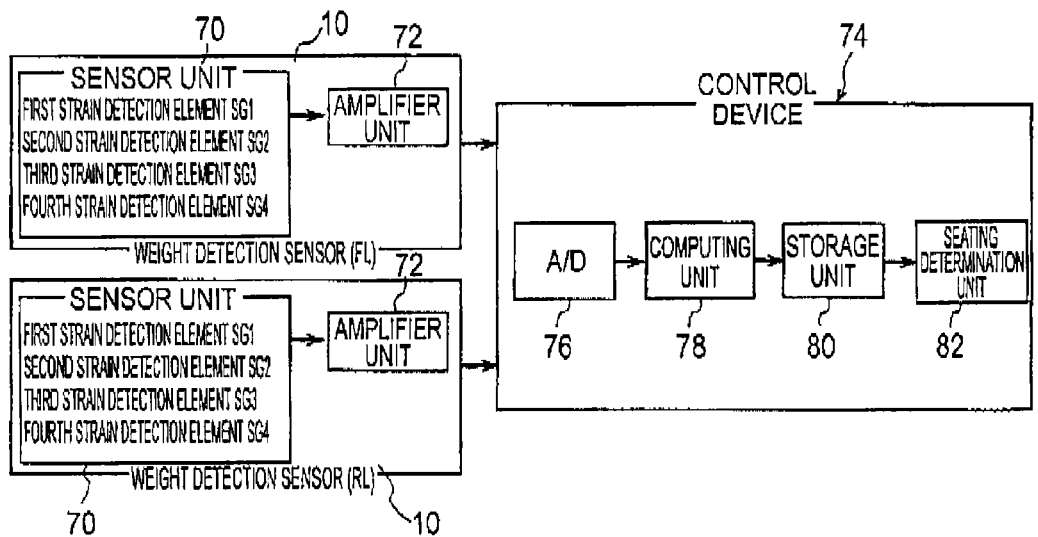
FIG. 5 is a block diagram illustrating the weight detection sensor and a control device.

In addition, as illustrated in FIG. 5, the weight detection sensor 10 has a sensor unit 70 that is configured to have the Wheatstone bridge circuit 50, which has the first to fourth strain detection elements SG1 to SG4, and the like, and an amplifier unit 72 that amplifies a detection signal which is generated by the sensor unit 70. The weight detection sensor 10 is connected to a control device 74, and a seat belt mounted detection unit, an airbag indicator lamp, and the like (not shown) are connected to the control device 74.

The control device 74 has an A/D converter 76 that digitally converts an analog detection signal from the weight detection sensor 10, and a computing unit 78 into which the detection signal from the weight detection sensor 10 is input. The computing unit 78 adds, for example, a detection value of the weight detection sensor 10 arranged on the front side FL and a detection value of the weight detection sensor 10 arranged on the back side RL of the left side upper rail 14L, stores the computed value in a storage unit 80, and then transmits the value to the a seating determination unit 82, "The presence of the passenger," "the absence of the passenger," and the like are determined and the airbag indicator lamp and the like are controlled through various determination processes by the seating determination unit 82.

The weight detection sensor outputs a positive detection signal in a case where a downward load is applied to the seat cushion 11 as, for example, the passenger sits in the vehicle seat apparatus 100. The weight detection sensor outputs a negative detection signal in a case where an upward load is applied to the seat cushion 11. Both of the weight detection sensors that are respectively arranged on the front side FL and the back side RL of the left side upper rail 14L are zero-adjusted to have a load value of zero in a state of vehicle shipment.

In a case where the passenger sits in the vehicle seat apparatus 100 equipped with the weight detection sensor 10 according to this embodiment, the weight of the passenger is applied in the up-down direction. Accordingly, as illustrated in FIGS. 7 and 8, the compressive deformation is generated at sites where the first strain detection element SG1 and the third strain detection element SG3 are adhered (compressive strain generation positions CS) and the tensile deformation is generated at sites where the second strain detection element SG2 and the fourth strain detection element SG4 are adhered (tensile strain generation positions TS).

It is known that, assuming that K is a gauge factor (K=2), E is a bridge voltage, and S1 to S4 are the strains of the respective strain detection elements caused by the weight of the passenger, a voltage e that is output to the Wheatstone bridge circuit is expressed by the following equation.

$$e = (E/4) \times K \times (S1 - S2 + S3 - S4)$$

The load of the passenger is obtained based on the voltage e that is output to the Wheatstone bridge circuit.

1. Examination of Arrangement of Strain Detection Element Unit in Case of Relative Angular Displacement for Collapse Directed Inside in Vehicle Width Direction and Operation Thereof The weight of the passenger is applied in the up-down direction in a case where the passenger sits on the seat cushion 11. However, a hip point HP where the weight of the passenger is applied is separated from a position of the seat frame 17 where the sensor substrate (strain body 20) is arranged, and thus the bending occurs in the seat frame 17 that extends horizontally in the left-right direction of the vehicle. Due to the bending, a relative angular displacement for a collapse directed inside in a vehicle width direction occurs in the seat frame 17 (and the connection member 23) extending in the front-back direction with respect to the upper rails 14R and 14L between the seat side fixing members (members of the seat frame 17 extending in the front-back direction) that correspond to both end portions of the seat frame 17 and the upper rails 14R and 14L. Accordingly, a load error for the collapse directed to a seat frame 17 side (inside) curved in the left-right direction is generated in the strain body 20 that detects the load of the passenger as the load generated in the up-down direction.

Figure 10A:
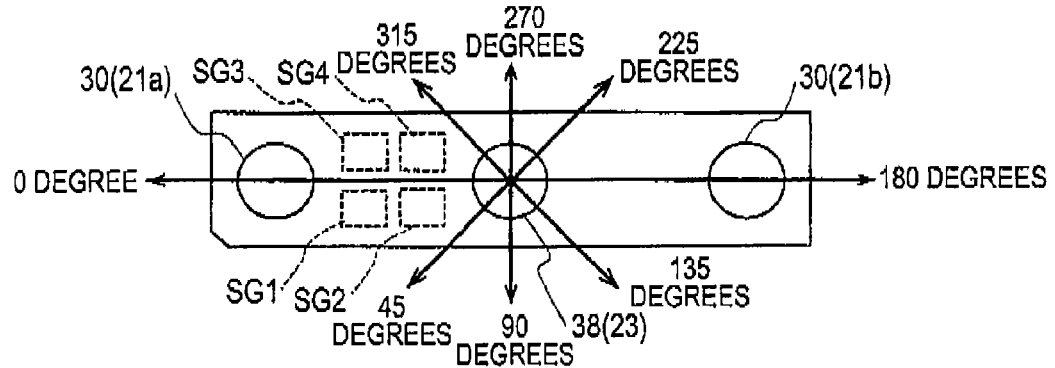
FIG. 10A is a diagram illustrating a direction of a load that is applied to a connection member in a case where the strain detection element is arranged between a first lower bracket and the connection member.
Figure 10B:
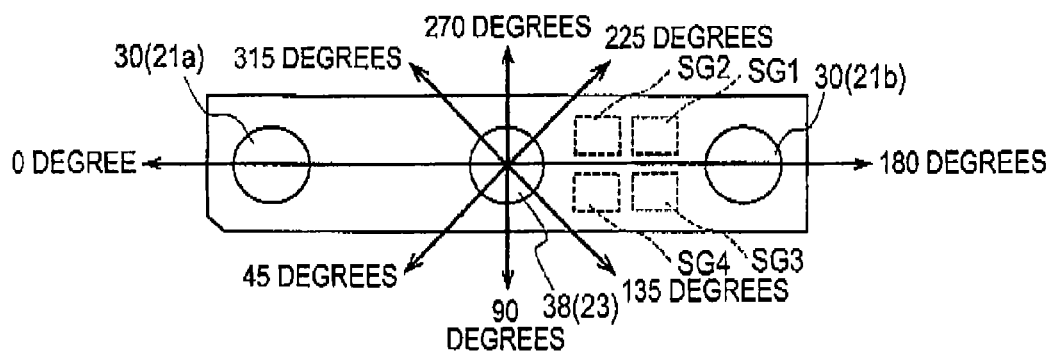
FIG. 10B is a diagram illustrating a direction of the load that is applied to the connection member in a case where the strain detection element is arranged between a second lower bracket and the connection member.

In a state where a constant load is applied to the hip point HP of the seat cushion 11, the inventors of the present invention performed measurements by changing a direction in which a force is applied by 45 degrees, as illustrated in FIGS. 10A and 10B, with regard to the load error detected by the strain detection element unit SU when a moment of the relative angular displacement is applied to the connection member 23 of the strain body 20.

In Case 1, the strain detection element unit SU is adhered between the first lower bracket 21a and the connection member 23. The first strain detection element SG1 and the third strain detection element SG3 are arranged on the first lower bracket 21a side, and the first strain detection element SG1 and the third strain detection element SG3 are arranged on the opposite sides across the front-back direction center line FRL of the strain body 20.

The second strain detection element SG2 and the fourth strain detection element SG4 are arranged on the connection member 23 side, and the second strain detection element SG2 and the fourth strain detection element SG4 are arranged on the opposite sides across the front-back direction center line FRL of the strain body 20.

In Case 2, the strain detection element unit SU is adhered between the second lower bracket 21b and the connection member 23. In addition, the first strain detection element SG1 and the third strain detection element SG3 are arranged on the second lower bracket 21b side, and the first strain detection element SG1 and the third strain detection element SG3 are arranged on the opposite sides across the front-back direction center line FRL of the strain body 20.

The second strain detection element SG2 and the fourth strain detection element SG4 are arranged on the connection member 23 side, and the second strain detection element SG2 and the fourth strain detection element SG4 are arranged on the opposite sides across the front-back direction center line FRL of the strain body 20.

Front and back end portions of the strain body 20 were fixed, and the load was added such that the tip end portion of the connection member 23 was bent in each of the predetermined angular directions.

Figure 11:
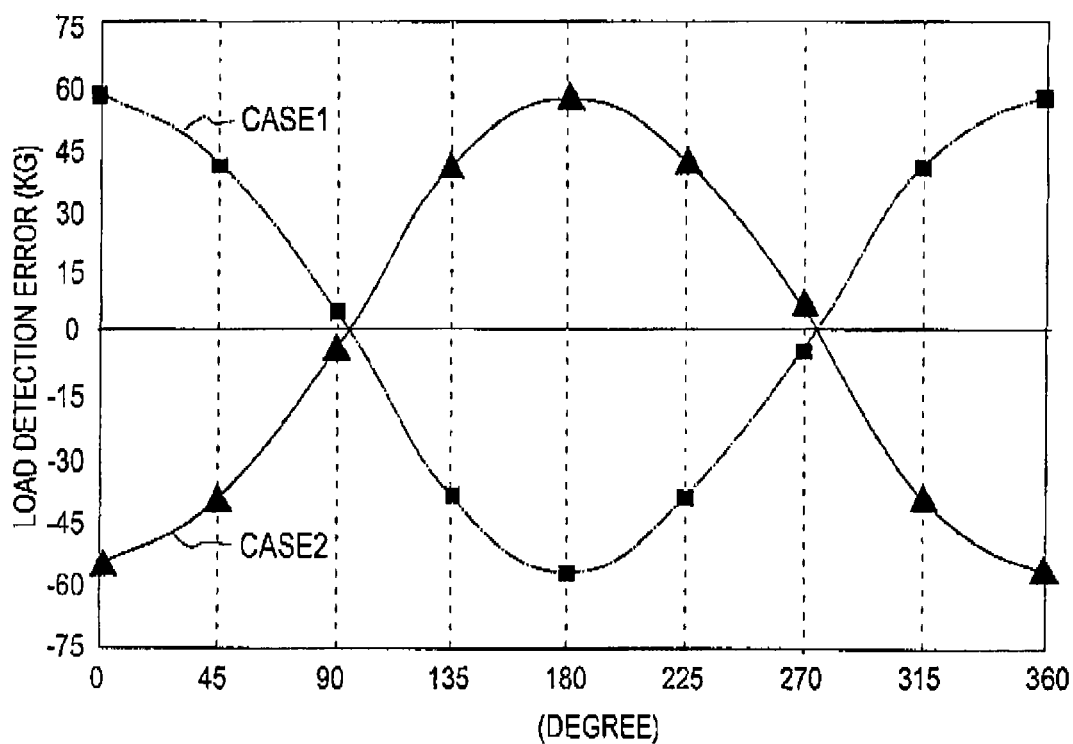
FIG. 11 is a diagram illustrating a relationship between a load that is added by changing a direction by 45 degrees and a value as a load error that is output to the strain detection element in a state where the load is added to a hip point.
Figure 12:
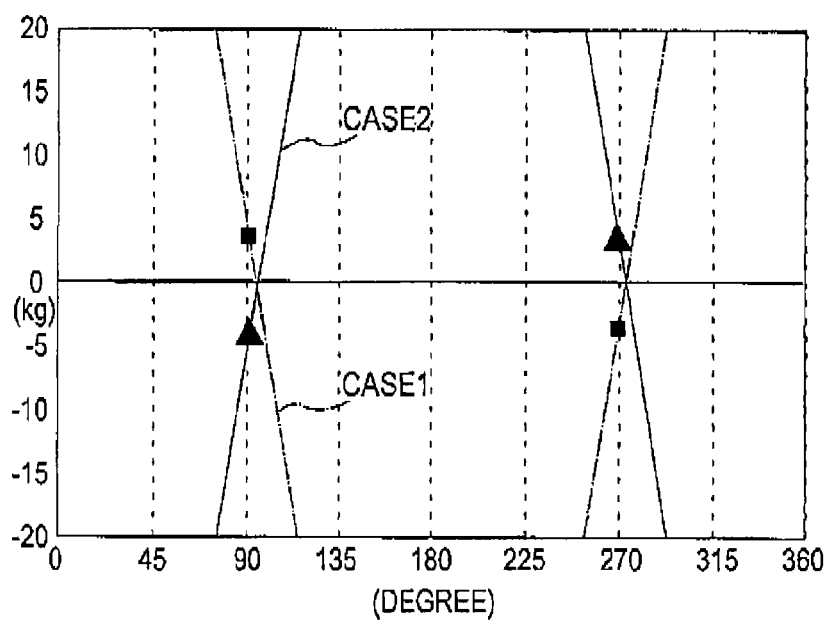
FIG. 12 is an enlarged diagram illustrating vicinities of 90 degrees and 270 degrees of FIG. 11.

FIGS. 11 and 12 (partially enlarged diagram illustrating vicinities of 90 degrees and 270 degrees in FIG. 11) illustrate a relationship between a direction of the force that generates the load error and the load error that is measured. The load error is approximately 55 Kg in Case 1 whereas the load error is approximately −55 Kg in Case 2 in a case where the force is added in the zero-degree (360-degree) direction.

The load error is approximately −55 Kg in Case 1 and the load error is approximately 55 Kg in Case 2 in a case where the force is added in the 180-degree direction.

The load error is approximately 38 Kg in Case 1 whereas the load error is approximately −38 Kg in Case 2 in a case where the force is added in the 45-degree and 315-degree directions.

The load error is approximately −38 Kg in Case 1 and the load error is approximately 38 Kg in Case 2 in a case where the force is added in the 135-degree and 225-degree directions.

In this manner, the load error in Case 1 and the load error in Case 2 have the same numerical values with the plus and minus signs reversed.

The first strain detection element SG1 to the fourth strain detection element SG4 are adhered to detect the strain in the front-back direction, not the strain in the left-right direction, but the load error is generated by components generating compression and tension in the front-back direction when the direction of the addition is 45 degrees, 135 degrees, 225 degrees, and 315 degrees. Accordingly, at 90 degrees and 270 degrees, the load error is supposed to be 0 Kg. However, a load error of approximately 4 Kg is shown in Case 1 and a load error of approximately −4 Kg is shown in Case 2 at 90 degrees, and a load error of approximately −4 Kg is shown in Case 1 and a load error of approximately 4 Kg is shown in Case 2 at 270 degrees, and the load error is generated although the load error is supposed to be zero.

Figure 14:
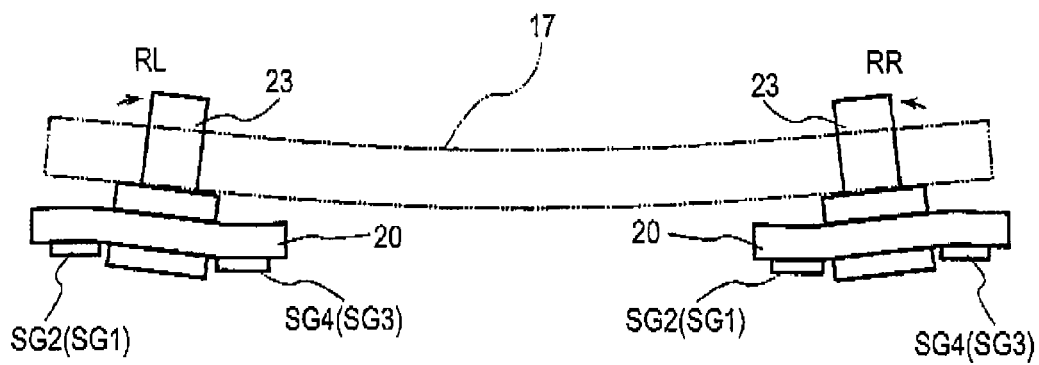
FIG. 14 is a diagram illustrating a state where the connection member of the weight detection sensor collapses inside as the seat frame in the left-right direction is bent.

As illustrated in FIG. 14, the load error not being zero at 90 degrees and 270 degrees in this manner is considered to be because the seat frame 17 that extends in the left-right direction is curved to have a downward convex shape and the seat side fixing member (seat frame 17) that extends in the front-back direction or the connection member 23 collapses inside in the vehicle width direction such that the load error, which is supposed to be zero, remains by a margin of the load error for the collapse directed inside.

Figure 13:
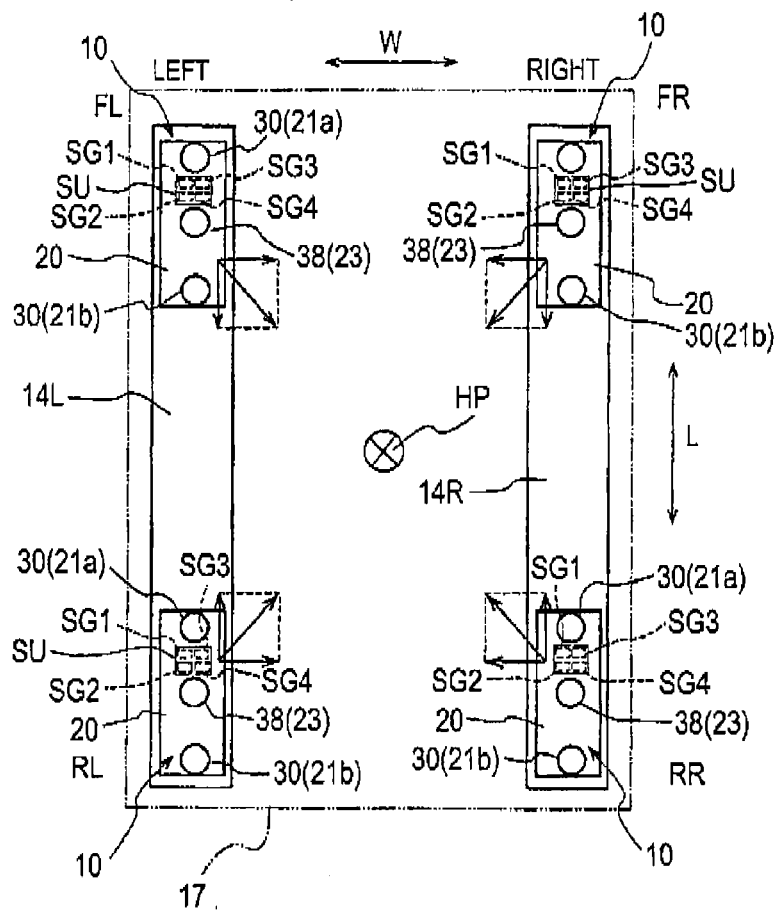
FIG. 13 is a diagram illustrating an arrangement of the weight detection sensor and a strain detection element unit according to the first embodiment.

Accordingly, the inventors of the present invention suggested the following arrangement of the weight detection sensor 10 and the strain detection element unit SU as illustrated in FIG. 13 so as to cancel the load error toward the inside caused by the seating load.

In this embodiment, the weight detection sensors 10 are configured as follows as illustrated in FIG. 13. The weight detection sensors 10 are arranged on the front side FL of the left side upper rail 14L and the front side FR of the right side upper rail 14R, and the strain detection element units SU are arranged at respective front ends (first lower bracket 21a (first end portion of the front side)) of the strain bodies 20 arranged in the left-right directions (left-right directions which form a pair). In addition, the weight detection sensors 10 are arranged on the back side RL of the left side upper rail 14L and the back side RR of the right side upper rail 14R, and the strain detection element units SU are arranged at the respective front ends (first lower bracket 21a) of the strain bodies 20 arranged in the left-right directions. In this manner, the strain detection element units SU are arranged at positions that are symmetrical in the left-right direction with respect to a centre line of the seat cushion 11 which extends in the front-back direction.

Regarding the strain detection element unit SU of the strain body 20 arranged on, for example, the back side RL of the left side upper rail 14L of the vehicle seat (seat cushion) 11 and the strain detection element unit SU of the strain body 20 arranged on the back side RR of the right side upper rail 14R, the left and right strain detection element units SU are arranged at the positions symmetrical with respect to the center line (not shown) that extends in the front-back direction through a center in the left-right direction of the vehicle seat 11 even in a case where the seat frame 17 that extends in the left-right direction is curved to have a downward convex shape and the seat side fixing member (seat frame 17) that extends in the front-back direction collapses inside in the vehicle width direction due to the seating load according to the weight detection sensor 10 of this embodiment. Accordingly, as illustrated in FIG. 14, opposite-direction strain errors are detected by, for example, the first strain detection element SG1 arranged in the strain detection element unit SU on the back side RL of the left side upper rail 14L and the first strain detection element SG1 arranged in the strain detection element unit SU on the back side RR of the right side upper rail 14R which has a symmetrical positional relationship, and thus the load error that is caused when the connection member 23 collapses inside in the vehicle width direction and detected can be cancelled. Likewise, the load error can be cancelled, by detecting the opposite-direction strain errors, similarly in the corresponding left and right second strain detection elements SG2, the left and right third strain detection elements SG3, and the left and right fourth strain detection elements SG4. In this manner, the load errors of the detection values of the strain detection element units SU arranged in the left-right direction can be cancelled.

Figure 15:
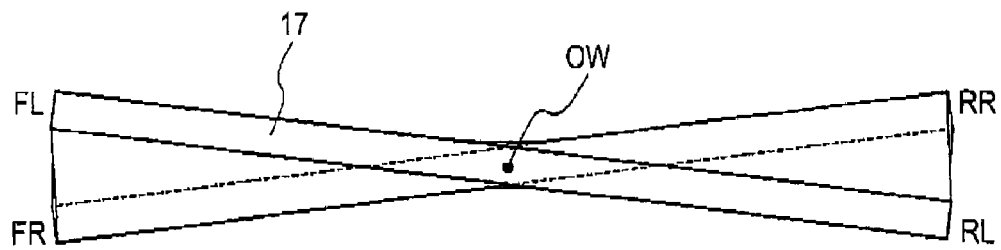
FIG. 15 is a diagram illustrating a state of where the seat frame is deformed when a biased load is applied to the seat frame.

2. Operation in Case of Relative Angular Displacement Directed for Twist in Opposite Directions In addition, in a case where a biased force for which the seat frame 17 is deformed through a sudden braking or the like works in one direction as illustrated in FIG. 15, the seat frame 17 tends to be elastically deformed such that the right side and the left side are relatively twisted in opposite directions about a central axis OW, which extends in the left-right direction, through a center of the seat frame 17 in the front-back direction.

Figure 16:
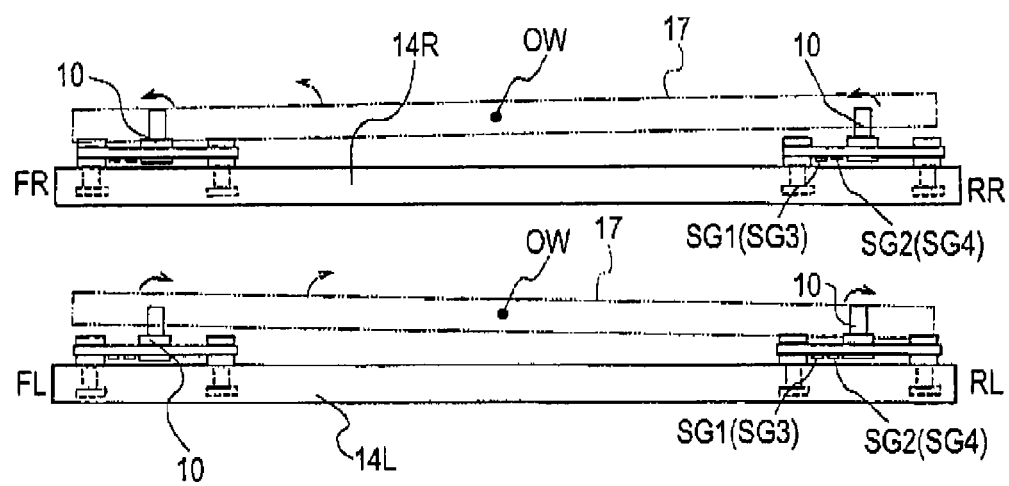
FIG. 16 is a diagram illustrating a relative angular displacement received by the weight detection sensor that is fixed to front sides and back sides of left side and right side upper rails.

In a case where the deformation occurs, a relative angular displacement occurs between the weight detection sensor according to this embodiment and the seat frame 17, at the front side FR and the back side RR of the right side upper rail 14R on which the weight detection sensor 10 is mounted, for a rotation in the same direction (counterclockwise direction in FIG. 16) as illustrated in FIG. 16.

In addition, a relative angular displacement occurs between the weight detection sensor according to this embodiment and the seat frame 17, at the front side FL and the back side RL of the left side upper rail 14L on which the weight detection sensor 10 is mounted, for a rotation in the same direction (clockwise direction in FIG. 16) as illustrated in FIG. 16.

As such, the relative displacement directed for a twist in the opposite directions occurs about the central axis OW that extends in the left-right direction between the seat frame 17 along the right side upper rail 14R and the seat frame 17 along the left side upper rail 14L.

Figure 17:
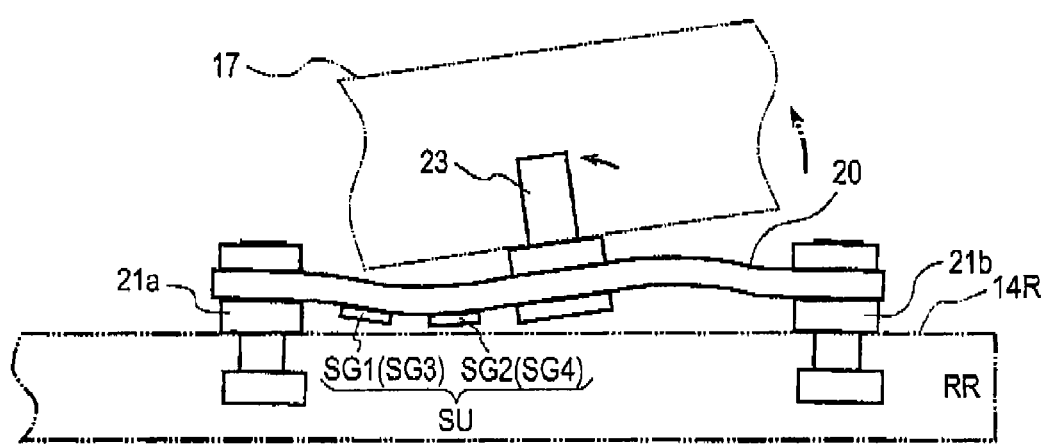
FIG. 17 is an explanatory diagram, viewed from a side, illustrating a state where the strain body is deformed by a rotational moment load component that is applied by the connection member which is fixed to the seat frame when the weight detection sensor fixed to a back side of a right side receives the relative angular displacement.

In a case where the load of the passenger is detected, the compressive strain generating a positive load error is further detected by the first strain detection element SG1 and the third strain detection element SG3 generating a positive compressive strain value, as illustrated in FIG. 17, on the back side RR of the right side upper rail 14R where the counterclockwise relative angular displacement occurs as described above. In a case where the load of the passenger is detected, the tensile strain generating a positive load error is further detected by the second strain detection element SG2 and the fourth strain detection element SG4 generating a positive tensile strain value.

When applied to the equation for the voltage e that is output to the Wheatstone bridge circuit which computes the load, $e=(E/4) \times K \times \{(S1-+\Delta s1)-(S2+\Delta s2)+(S3+\Delta s3)-(S4+\Delta s4)\}$ when the respective strains generating the load errors of the respective strain detection elements are assumed to be $\Delta s1$ to $\Delta s4$, and $e=e^0+\Delta e$ when it is assumed that $e^0=(E/4) \times K \times (S1-S2+S3-S4)$ and $\Delta e=(E/4) \times K \times (\Delta s1-\Delta s2+\Delta s3-\Delta s4)$.

Figure 18:
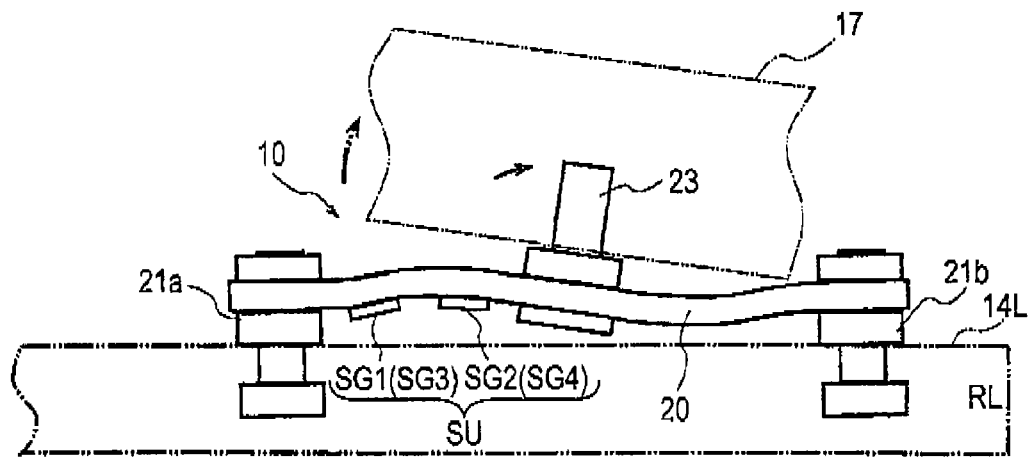
FIG. 18 is an explanatory diagram, viewed from a side, illustrating a state where the strain body is deformed by the rotational moment load component that is applied by the connection member which is fixed to the seat frame when the weight detection sensor fixed to a back side of a left side receives the relative angular displacement.

In a case where the weight of the passenger is detected, the tensile strain generating a negative load error is detected by the first strain detection element SG1 and the third strain detection element SG3 generating the positive compressive strain value, as illustrated in FIG. 18, on the back side RL of the left side upper rail 14L when the relative angular displacement occurs as described above, and the compressive strain generating a negative load error is detected by the second strain detection element SG2 and the fourth strain detection element SG4 generating the positive tensile strain value.

When applied to the equation for the voltage e that is output to the Wheatstone bridge circuit which computes the load, $e=(E/4) \times K \times \{(S1-\Delta s1)-(S2-\Delta s2)+(S3-\Delta s3)-(S4-\Delta s4)\}$ when the respective strains generating the load errors of the respective strain detection elements are assumed to be $\Delta s1$ to $\Delta s4$, and $e=e^0-\Delta e$ when it is assumed that $e^0=(E/4) \times K \times (S1-S2+S3-S4)$ and $\Delta e=(E/4) \times K \times (\Delta s1-\Delta s2+\Delta s3-\Delta s4)$ as above.

Herein, the load of the passenger sitting in the vehicle seat is obtained by adding the load on the back side RL of the left side upper rail 14L to the load on the back side RR of the right side upper rail 14R and doubling the result, and thus the load error de of the output voltage can be cancelled when the output voltage (or the load value) that is obtained on the back side RL of the left side upper rail 14L is added to the output voltage (or the load value) that is obtained on the back side RR of the right side upper rail 14R.

Likewise, the strain error in a case where the relative angular displacement directed for the twist in the opposite directions occurs can be cancelled also between the strain detection element unit SU of the weight detection sensor 10 disposed on the front side FR of the right side upper rail 14R and the strain detection element unit SU of the weight detection sensor 10 disposed on the front side FL of the left side upper rail 14L.

Even in a case where the relative angular displacement occurs for the collapse directed inside the seat frame 17 (or the connection member 23) that extends in the front-back direction by the seating load and even in a case where the relative angular displacement directed to twist the seat frame 17 in the opposite directions occurs, the weight of the passenger can be accurately detected by cancelling the load error with the output voltage of all of the weight detection sensors 10 mounted on the one vehicle seat 11 based only on the strain in the up-down direction which is detected when the passenger sits.

As is apparent in the above description, according to the weight detection sensor 10 of this embodiment, the hip point HP to which the weight of the passenger is applied is separated from the position of the seat frame 17 where the sensor substrate (strain body 20) is arranged in a case where the passenger sits in the vehicle seat (seat cushion) 11, and thus the load error for the collapse directed inside in the vehicle width direction is generated in each of the strain bodies 20 by the bending of the seat frame 17 which extends horizontally in the left-right direction. Even in this case, a strain force for the collapse inside in the vehicle width direction is added to the first to fourth strain detection elements SG1 to SG4 arranged on the right side of the strain detection element unit SU and the first to fourth strain detection elements SG1 to SG4 arranged on the left side of the strain detection element unit SU that are at symmetrical positions if, for example, the strain detection element units SU are arranged in pair in the left and the right of the seat cushion 11 and at the symmetrical positions, and thus the strain error is generated in the opposite directions in the corresponding strain detection elements (for example, the first strain detection elements SG1) of the left and right strain detection element units SU. Accordingly, the strain error can be cancelled.

In a case where the passenger sits in the seat cushion 11, almost no bending as a beam member that extends in the front-back direction occurs in the seat frame 17 that extends horizontally in the front-back direction because of a high rigidity of the slide rails 14 and 15 and the seat frame 17 in the front-back direction. Accordingly, it is practical to consider that there is no load error for a collapse directed inside in the front-back direction caused by the seating load.

In addition, the relative angular displacement is in the opposite directions in the left and the right of the seat cushion 11 between the seat frame 17 and the upper rail 14 when a large force is generated in the vehicle due to the sudden braking or the like and the relative angular displacement generating the load error directed to twist the seat frames 17, which form a pair, in the opposite directions works in one direction between the seat frame 17 and the upper rail 14 about the central axis OW extending in the left-right direction. Accordingly, regarding the first to fourth strain detection elements SG1 to SG4 that are arranged at the symmetrical positions in the left and the right of the seat cushion 11, the first to fourth strain detection elements SG1 to SG4 arranged on the right side and the first to fourth strain detection elements SG1 to SG4 arranged on the left side that correspond to each other (for example, the first strain detection elements) generate the strain error in the opposite directions, and thus the strain error can be cancelled.

Figure 19:
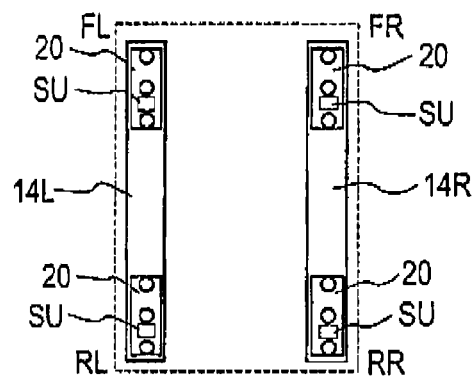
FIG. 19 is a diagram illustrating another example in which the weight detection sensor is arranged at four sites.

In the above-described embodiment, the weight detection sensors 10 are arranged on the front side and the back side of the left side upper rail 14L and the front side and the back side of the right side upper rail 14R, and the strain detection element units SU are arranged at the front ends of the front and back strain bodies 20 arranged in the left-right directions. However, the arrangement is not limited thereto but, as illustrated in FIG. 19 for example, the strain detection element units SU may be arranged on back ends of the front and back strain bodies 20 arranged in the left and right seat cushions 11.

Figure 20:
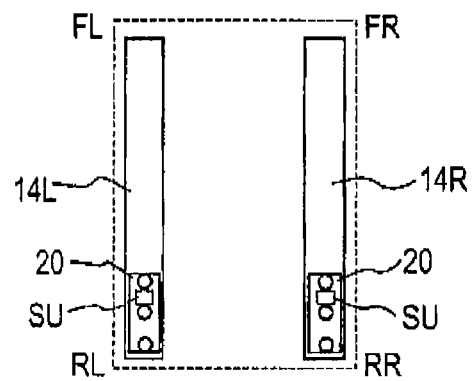
FIG. 20 is a diagram illustrating another example in which the weight detection sensor is arranged at two sites on the back side.
Figure 21:
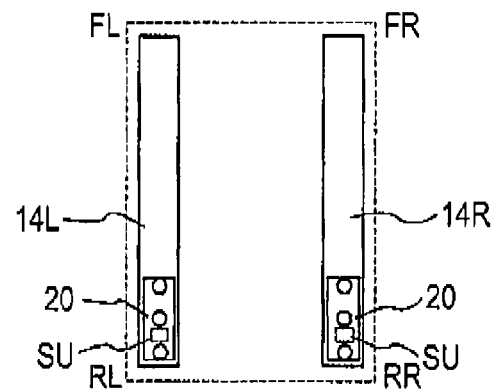
FIG. 21 is a diagram illustrating yet another example in which the weight detection sensor is arranged at two sites on the back side.

In addition, as illustrated in FIG. 20, the weight detection sensors 10 (strain bodies 20) may be arranged on the back side RL of the left side upper rail 14L and the back side RR of the right side upper rail 14R, and the strain detection element units SU may be arranged on the front ends of the strain bodies 20 on the back side arranged in the left-right direction. In addition, as illustrated in FIG. 21, the weight detection sensors 10 (strain bodies 20) may be arranged on the back side RL of the left side upper rail 14L and the back side RR of the right side upper rail 14R, and the strain detection element units SU may be arranged on the back ends of the strain bodies 20 on the back side arranged in the left-right direction. In the weight detection sensors 10 of FIGS. 20 and 21, the strain detection elements that correspond to each other (for example, the first strain detection elements SG1) generate the strain error in the opposite directions between the strain detection element units SU which are arranged at the symmetrical positions in the left-right direction, and thus the strain error can be cancelled when the detected strains are added. In addition, in this embodiment, the strain detection element units SU may be arranged at only two sites on the back side of the upper rails 14R and 14L, and thus manufacturing costs can be reduced.

Embodiment 2

Next, a second embodiment of the weight detection sensor 10 of the vehicle seat apparatus disclosed here will be described with reference to the accompanying drawings.

Figure 22:
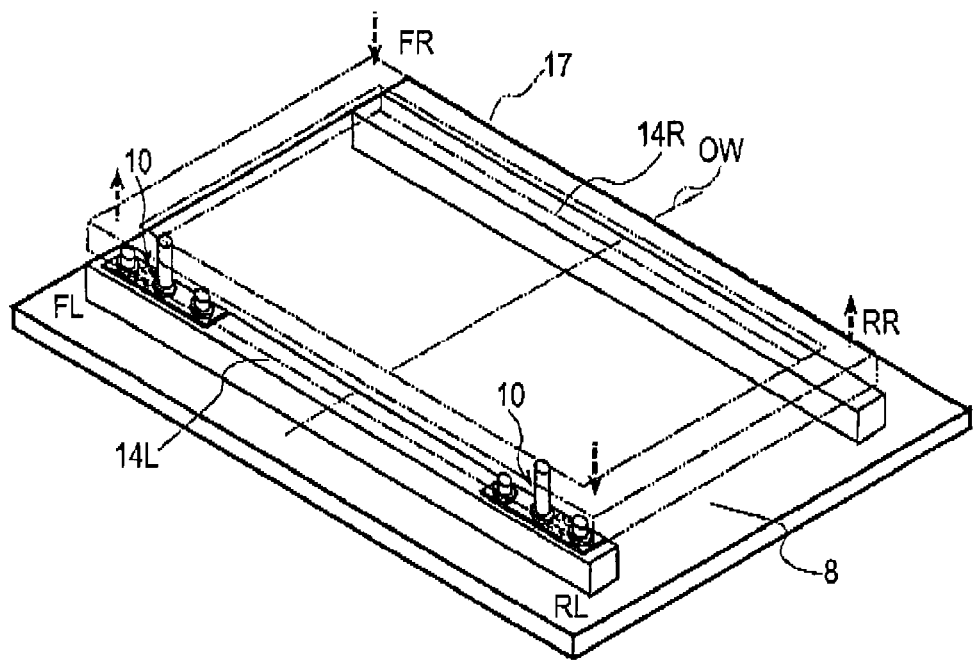
FIG. 22 is a diagram illustrating an arrangement of a weight detection sensor according to a second embodiment and a state where a force is added when the biased load is applied to the seat frame.

In this embodiment, as illustrated in FIG. 22, the strain detection element unit SU that is arranged on the front side of the left side upper rail 14L constitutes the first end portion (first lower bracket 21a) on the front side of the strain body 20, and the strain detection element unit SU that is arranged on the back side of the left side upper rail 14L constitutes the first end portion (second lower bracket 21b) on the back side of the strain body 20. The first end portion (first lower bracket 21a) on the front side and the first end portion (second lower bracket 21b) on the back side are positioned at symmetrical positions (symmetrical positions in the front-back directions forming a pair) which have a center line (not shown) crossing the left side upper rail 14L in the left-right direction as an axis of symmetry. The other configuration is similar to that of the first embodiment, and the same reference numerals will be attached and description thereof will be omitted.

Operation in Case of Relative Angular Displacement for Twist Directed in Opposite Directions The seat frame (seat side fixing member) 17 in which the weight detection sensor 10 is arranged is a rigid body that has a rectangular shape. However, in a case where the biased force works in one direction through the sudden braking or the like to deform the seat frame 17 as illustrated in FIG. 15, the seat frame 17 tends to be elastically deformed such that the front side and the back side are relatively twisted in opposite directions in the up-down direction about the central axis OW which extends in the front-back direction.

Figure 23:
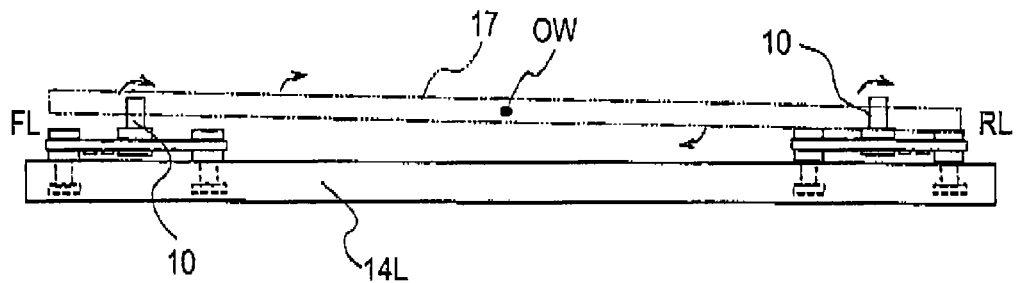
FIG. 23 is a diagram illustrating a relative angular displacement that is received by the weight detection sensor which is fixed to the front side and the back side of the left side upper rail.

In a case where the deformation occurs, the relative angular displacement occurs between the weight detection sensor and the seat frame 17, at the front side FL and the back side RL of the left side upper rail 14L on which the weight detection sensor 10 is mounted, for the rotation in the same direction as illustrated in FIG. 23.

Figure 24:
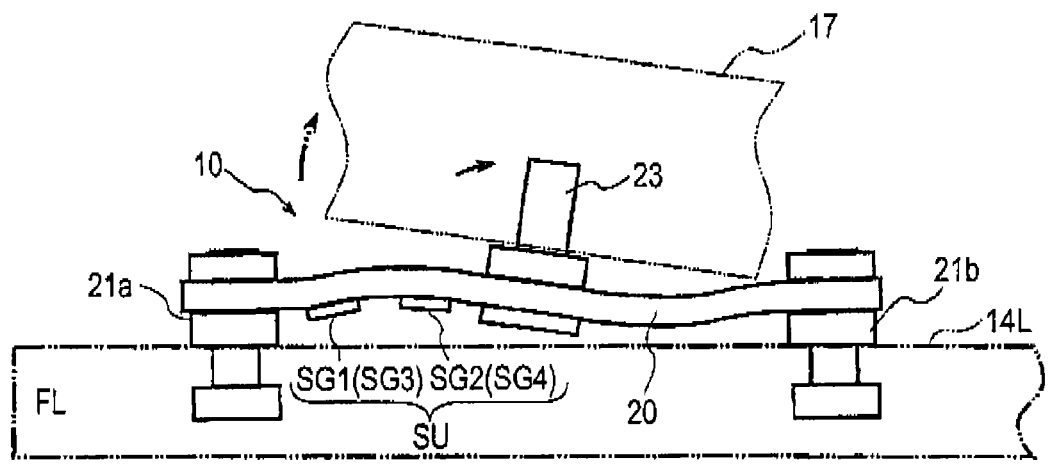
FIG. 24 is an explanatory diagram, viewed from a side, illustrating a state where the strain body is deformed by the rotational moment load component that is applied by the connection member which is fixed to the seat frame when the weight detection sensor fixed to the front side of the left side upper rail receives the relative angular displacement.

Accordingly, in a case where the strain detection element unit SU is arranged on a first end portion (first lower bracket 21a) side on the front side of the strain body 20 on the front side FL of the left side upper rail 14L and the weight of the passenger is detected, the tensile strain generating the negative load error is detected by the first strain detection element SG1 and the third strain detection element SG3 generating the positive compressive strain value and the compressive strain generating the negative load error is detected by the second strain detection element SG2 and the fourth strain detection element SG4 generating the positive tensile strain value as illustrated in FIG. 24.

In this case, when applied to the equation for the voltage e that is output to the Wheatstone bridge circuit which computes the load, $e=(E/4)\times K\times\{(S1-\Delta s1)-(S2-\Delta s2)+(S3-\Delta s3)-(S4-\Delta s4)\}$ when the respective strains generating the load errors of the respective strain detection elements are assumed to be $\Delta s1$ to $\Delta s4$, and $e=e^0-\Delta e$ when it is assumed that $e^0=(E/4)\times K\times(S1-S2+S3-S4)$ and $\Delta e=(E/4)\times K\times(\Delta s1-\Delta s2+\Delta s3-\Delta s4)$.

Figure 25:
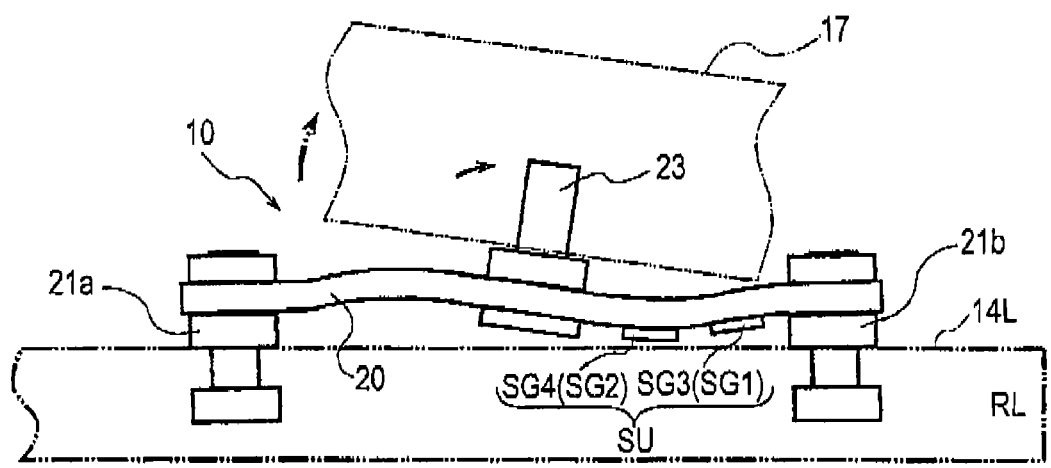
FIG. 25 is an explanatory diagram, viewed from a side, illustrating a state where the strain body is deformed by the rotational moment load component that is applied by the connection member which is fixed to the seat frame when the weight detection sensor fixed to the back side of the left side upper rail receives the relative angular displacement.

In a case where the strain detection element unit SU is arranged on a first end portion (second lower bracket 21b) side on the back side of the strain body 20 on the back side RL of the left side upper rail 14L and the weight of the passenger is detected, the compressive strain generating the positive load error is further detected by the first strain detection element SG1 and the third strain detection element SG3 generating the positive compressive strain value and the tensile strain generating the positive load error is further detected by the second strain detection element SG2 and the fourth strain detection element SG4 generating the positive tensile strain value as illustrated in FIG. 25.

In this case, when applied to the equation for the voltage e that is output to the Wheatstone bridge circuit which computes the load, $e=(E/4)\times K\times\{(S1+\Delta s1)-(S2+\Delta s2)+(S3+\Delta s3)-(S4+\Delta s4)\}$ when the respective strains generating the load errors of the respective strain detection elements are assumed to be $\Delta s1$ to $\Delta s4$, and $e=e^0+\Delta e$ when it is assumed that $e^0=(E/4)\times K\times(S1-S2+S3-S4)$ and $\Delta e=(E/4)\times K\times(\Delta s1-\Delta s2+\Delta s3-\Delta s4)$.

Herein, the load of the passenger sitting in the vehicle seat is obtained by adding the load on the back side RL of the left side upper rail 14L to the load on the front side FL and doubling the result.

Accordingly, the load error $\Delta e$ can be cancelled when the output voltage (or the load value) that is obtained on the front side FL is added to the output voltage (or the load value) that is obtained on the back side RL.

As is apparent above, according to the weight detection sensor 10 of this embodiment, the first end portion (first lower bracket 21a) of the strain body 20 is arranged to be the front side end portion of the strain body 20 in the strain body 20 that is fixed to the mounting surface 18 which is arranged in the fixing unit on the front side FL of the left side upper rail 14L, and the first end portion (second lower bracket 21b) of the strain body 20 is arranged to be the back side end portion of the strain body 20 in the strain body 20 that is fixed to the mounting surface 18 which is arranged in the fixing unit on the back side RL of the left side upper rail 14L (arranged in the symmetrical positions in the front-back directions forming a pair).

When the strain detection element unit SU is arranged in the front side end portion (first lower bracket 21a) of the strain body 20 in the fixing unit on the front side FL of the left side upper rail 14L, the strain detection element unit SU is arranged in the back side end portion (second lower bracket 21b) in the fixing unit on the back side RL of the left side upper rail 14L.

Accordingly, when a large force is generated in the vehicle due to the sudden braking or the like and the relative angular displacement generating the load error directed for twist about an axis of rotation in the left-right direction works in one direction between the seat frame 17 and the upper rail 14L, the relative angular displacement working between the seat frame 17 and the upper rail 14L on the front side FL and the relative angular displacement working between the seat frame 17 and the upper rail 14L on the back side RL have the same direction in, for example, the left side upper rail 14L (refer to FIG. 23). However, the strains in the opposite directions are generated (refer to FIGS. 24 and 25) in the first end portion (first lower bracket 21a) on the front side of the strain body 20 and the first end portion (second lower bracket 21b) on the back side of the strain body 20, and thus the strain detection element (for example, the first strain detection element) of the strain detection element unit SU arranged in the first end portion on the front side and the strain detection element (first strain detection element) of the strain detection element unit SU arranged in the first end portion on the back side that corresponds to the strain detection element detect the strain errors in the opposite directions. In this manner, the front-back strain errors can be cancelled.

In this manner, regarding the strain detection element units SU arranged at the symmetrical front-back positions of the upper rail 14L on one side, the corresponding strain detection elements (for example, the first strain detection elements) of the first to fourth strain detection elements SG1 to SG4 that are arranged on the front side FL and the first to fourth strain detection elements SG1 to SG4 that are arranged on the back side RL generate the strain errors in the opposite directions, and thus the strain errors can be cancelled.

Figure 6B:
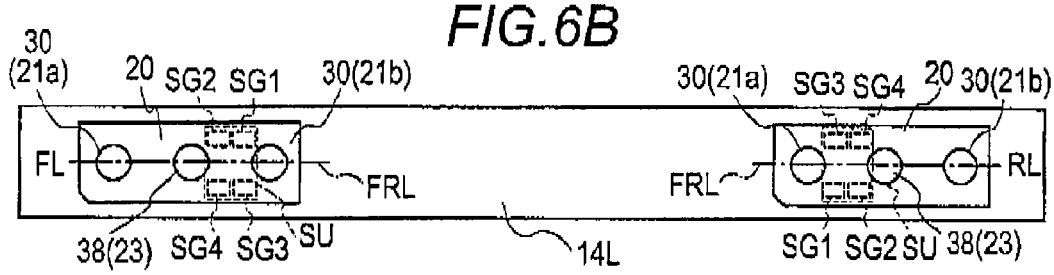
FIG. 6B is a diagram illustrating another example of the state where each of the strain detection elements is adhered to the strain body of the weight detection sensor.

In the above-described embodiment, the strain detection element units SU are arranged on the first end portion (first lower bracket 21a) side on the front side of the strain body 20 arranged on the front side and the first end portion (second lower bracket 21b) side on the back side of the strain body 20 arranged on the back side in the left side upper rail 14L. However, the arrangement is not limited thereto but, as illustrated in FIG. 6B for example, the strain detection element units SU may be arranged on the back side end portion (second lower bracket 21b) side of the strain body 20 arranged on the front side FL and the front side end portion (first lower bracket 21a) side of the strain body 20 arranged on the back side RL in the left side upper rail 14L.

In addition, the strain detection element unit SU may be arranged between the first lower bracket 21a and the connection member 23 in the strain body 20 on the front side FL of the left side upper rail 14L and may be arranged between the second lower bracket 21b and the connection member 23 in the strain body 20 on the back side RL. In the right side upper rail 14R, the strain detection element unit SU may be arranged between the second lower bracket 21b and the connection member 23 in the strain body 20 on the front side FR of the right side upper rail 14R and may be arranged between the first lower bracket 21a and the connection member 23 in the strain body 20 on the back side RR.

The first strain detection element SG1 and the third strain detection element SG3 are arranged on the opposite sides about the front-back direction center line FRL of the strain body 20 on the mounting surface 18 on the front side FL of the left side upper rail 14L, and the second strain detection element SG2 and the fourth strain detection element SG4 are arranged on the opposite sides about the front-back direction center line FRL of the strain body 20. The first strain detection element SG1 and the third strain detection element SG3 are arranged on the opposite sides about the front-back direction center line FRL of the strain body 20 on the mounting surface 18 on the back side RL of the left side upper rail 14L, and the second strain detection element SG2 and the fourth strain detection element SG4 are arranged on the opposite sides about the front-back direction center line FRL of the strain body 20.

Figure 26:
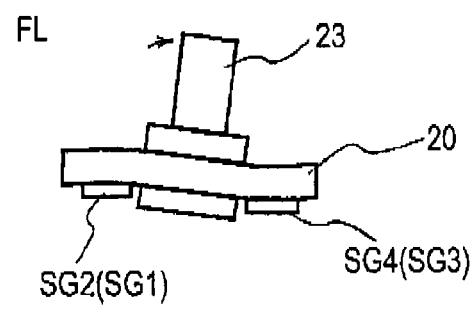
FIG. 26 is an explanatory diagram, viewed from a back face, illustrating a state where the strain body is deformed by the rotational moment load component working in the left-right direction when the relative angular displacement is received in an oblique direction that is inclined from a front-back direction on the front side of the left side upper rail.
Figure 27:
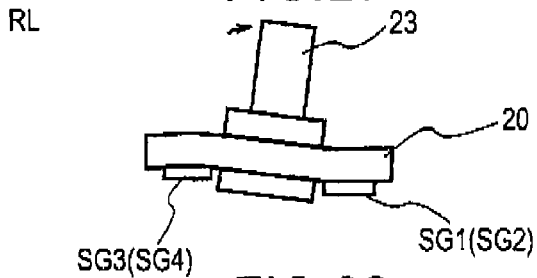
FIG. 27 is an explanatory diagram, viewed from the back face, illustrating a state where the strain body is deformed by the rotational moment load component working in the left-right direction when the relative angular displacement is received in the oblique direction that is inclined from the front-back direction on the back side of the left side upper rail.

Accordingly, with regard to the strain generated by the relative angular displacement that also affects the left-right direction in a rotational angular displacement in a direction inclined from the front-back direction or the like rather than the strict front-back direction of the vehicle, the compressive strain is detected by the first strain detection element SG1 and the second strain detection element SG2 on the front side FL of the left side upper rail 14L as illustrated in FIG. 26 for example, and the tensile strain is detected by the first strain detection element SG1 and the second strain detection element SG2 on the back side RL of the left side upper rail 14L as illustrated in FIG. 27 for example. In addition, in this case, the tensile strain is detected by the third strain detection element SG3 and the fourth strain detection element SG4 on the front side FL, and the compressive strain is detected by the third strain detection element SG3 and the fourth strain detection element SG4 on the back side RL. Accordingly, the output voltage values (or the load values obtained based on the output voltage) of the load errors detected from the strain detection element units SU on the front and back sides FL and RL are output as values with the reversed plus and minus signs, and are offset by adding the output values of the front and back weight detection sensors.

Embodiment 3

Next, a third embodiment of the weight detection sensor 10 of the vehicle seat apparatus disclosed here will be described with reference to the accompanying drawings.

Figure 28:
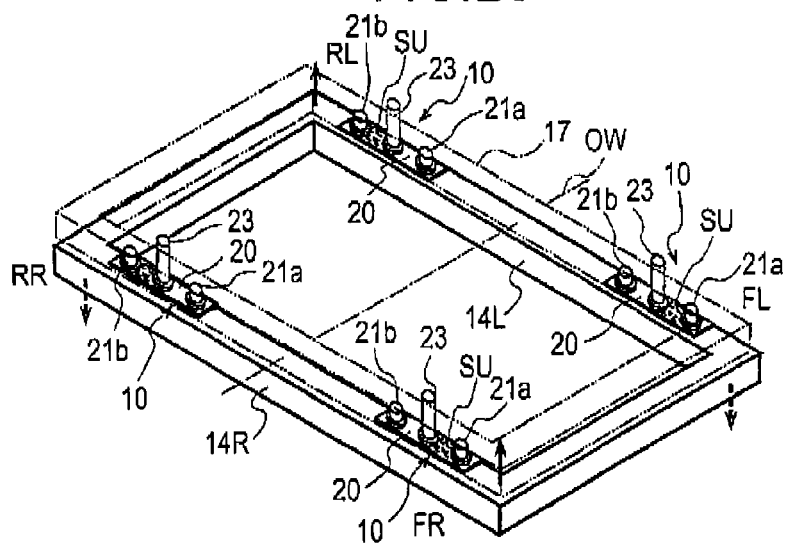
FIG. 28 is a diagram illustrating an arrangement of a weight detection device according to a third embodiment and a state where a force is added when the biased load is applied to the seat frame.
Figure 29A:
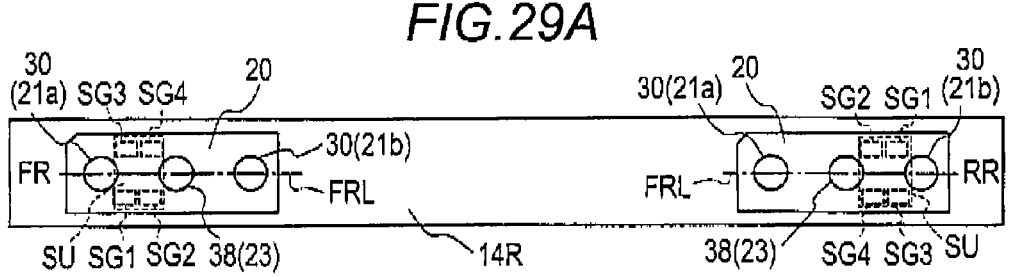
FIG. 29A is a diagram illustrating an arrangement of the strain detection element unit of the right side upper rail according to the third embodiment.
Figure 29B:
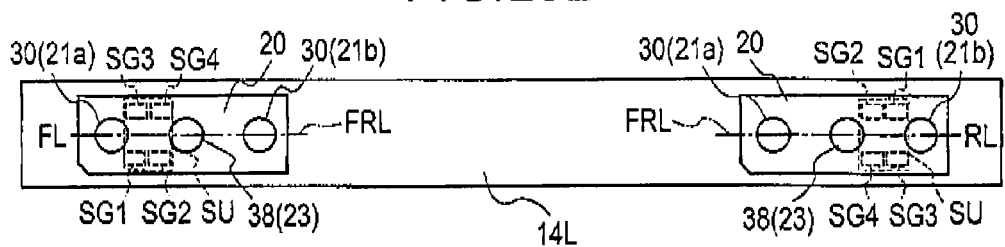
FIG. 29B is a diagram illustrating an arrangement of the strain detection element unit of the left side upper rail.
Figure 30A:
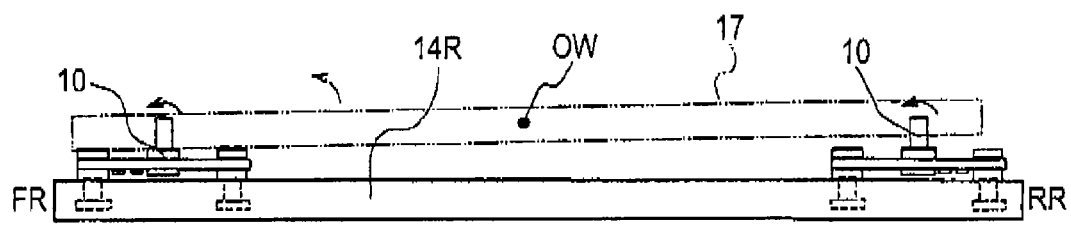
FIG. 30A is a diagram illustrating the relative angular displacement that is received by the weight detection sensor which is fixed to the front side and the back side of the right side upper rail.
Figure 30B:
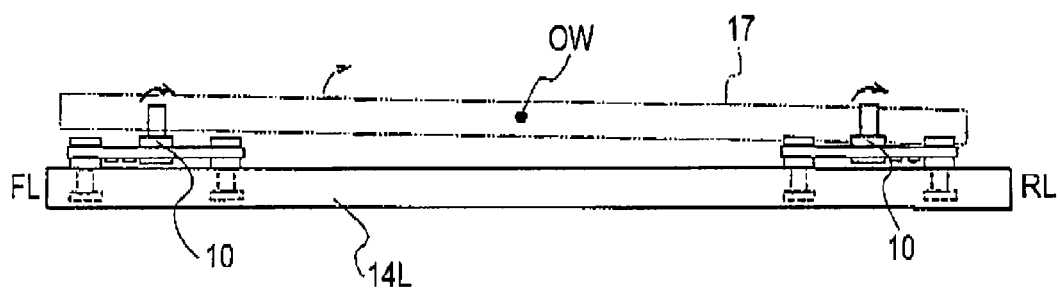
FIG. 30B is a diagram illustrating the relative angular displacement that is received by the weight detection sensor which is fixed to the front side and the back side of the left side upper rail.

As illustrated in FIG. 28, in the weight detection sensor of the vehicle seat apparatus according to this embodiment, the first end portion (first lower bracket 21a) of the strain body 20 where the strain detection element unit SU is arranged is arranged to be the front side end portion of the strain body 20 in the strain body 20 that is fixed to the mounting surface 18 which is arranged in the fixing unit on the front side FL of the left side upper rail 14L, and the first end portion (second lower bracket 21b) of the strain body 20 where the strain detection element unit SU is arranged is arranged to be the back side end portion of the strain body 20 in the strain body 20 that is fixed to the mounting surface 18 which is arranged in the fixing unit on the back side RL of the left side upper rail 14L (refer to FIG. 29B).

In addition, the first end portion (first lower bracket 21a) of the strain body 20 where the strain detection element unit SU is arranged is arranged to be the front side end portion of the strain body 20 in the strain body 20 that is fixed to the mounting surface 18 which is arranged in the fixing unit on the front side FR of the right side upper rail 14R, and the first end portion (second lower bracket 21b) of the strain body 20 where the strain detection element unit SU is arranged is arranged to be the back side end portion of the strain body 20 in the strain body 20 that is fixed to the mounting surface 18 which is arranged in the fixing unit on the back side RR of the right side upper rail 14R (refer to FIG. 29A).

At the same time, in the above-described arrangement, the strain detection element units SU are arranged at left and right positions on the front sides FL and FR and on the back sides RL and RR of the left and right upper rails 14L and 14R that are symmetrical with each other (refer to FIG. 28).

In this manner, the strain detection element units SU are arranged at the four positions of the left and right upper rails 14L and 14R that are symmetrical in the front-back direction. The third embodiment is different from the first and second embodiments regarding these points, but is similar to the first and second embodiments in the other configuration, and thus the same reference numerals will be attached thereto and description thereof will be omitted.

1. Operation in Case of Relative Angular Displacement for Collapse Directed Inside in Vehicle Width Direction According to the weight detection sensor of this embodiment, the strain detection element units SU are arranged at the positions on the front sides FL and FR and the back sides RL and RR of the left and right upper rails 14L and 14R that are symmetrical with each other in the left-right direction. Accordingly, the strain errors in the opposite directions are detected by, for example, the first strain detection element SG1 that is arranged in the strain detection element unit SU on the back side RL of the left side upper rail 14L and the first strain detection element SG1 that is arranged in the strain detection element unit SU on the back side RR of the right side upper rail 14R which has the symmetrical positional relationship, and thus the detected load error for the collapse directed inside in the vehicle width direction of the connection member 23 can be cancelled. Likewise, the load error can be cancelled, by detecting the opposite-direction strain errors, similarly in the corresponding left and right second strain detection elements SG2, the left and right third strain detection elements SG3, and the left and right fourth strain detection elements SG4. In this manner, the load errors of the detection values of the strain detection element units SU arranged in the left-right direction can be cancelled.

Likewise, the load errors can be cancelled in the first to fourth strain detection elements SG1 to SG4 corresponding in the left-right direction in the strain detection element units SU on the front side FL of the left side upper rail 14L and the strain detection element units SU on the front side FR of the right side upper rail 14R.

2. Operation in Case of Relative Angular Displacement Directed for Twist in Opposite Directions According to the weight detection sensor of this embodiment, the strain detection element units SU are arranged at the positions of the left and right upper rails 14L and 14R that are symmetrical with each other in the front-back direction. Accordingly, the strains in the opposite directions are generated in the first end portion (first lower bracket 21a) on the front side of the strain body 20 and the first end portion (second lower bracket 21b) on the back side on, for example, the left side (left side upper rail 14L), and the strain detection element (for example, the first strain detection element) of the strain detection element unit SU arranged in the first end portion (first lower bracket 21a) on the front side FL of the left side upper rail 14L and the strain detection element (first strain detection element) of the strain detection element unit SU arranged in the first end portion (second lower bracket 21b) on the back side RL of the left side upper rail 14L which corresponds to the strain detection element detect the strain errors in the opposite directions. In this manner, the strain errors of the front and back sides FL and RL can be cancelled in the left side upper rail 14L. The strain errors on the front and back sides FR and RR can be cancelled also on the right side (right side upper rail 14R).

In addition, the strain detection element units SU are arranged at the positions on the front sides FL and FR and on the back sides RL and RR of the left and right upper rails 14L and 14R that are symmetrical with each other in the left-right direction, and the relative angular displacement directed for the twist in the opposite directions is generated in the left and right strain detection element units SU (refer to FIGS. 17 and 18). Accordingly, the first strain detection element SG1 arranged, for example, in the strain detection element unit SU on the back side RL of the left side upper rail 14L and the first strain detection element SG1 arranged in the strain detection element unit SU on the back side RR of the right side upper rail 14R which has the symmetrical positional relationship can detect the strain errors in the opposite directions. In this manner, the load errors can be cancelled. Likewise, the load error can be cancelled, by detecting similarly the opposite-direction strain errors, in the corresponding left and right second strain detection elements SG2, the left and right third strain detection elements SG3, and the left and right fourth strain detection elements SG4. In this manner, the load errors of the detection values of the strain detection element units SU arranged on the front sides FL and FR and on the back sides RL and RR of the left side upper rail 14L and the right side upper rail 14R can be cancelled.

As is apparent in the above description, according to the weight detection sensor of this embodiment, the first end portion (first lower bracket 21a) of the strain body 20 is arranged to be the front side end portion of the strain body 20 in the strain body 20 that is arranged in the fixing unit on the front side FL of the left side upper rail 14L, and the first end portion (first lower bracket 21a) of the strain body 20 is arranged to be the front side end portion of the strain body 20 in the strain body 20 that is arranged in the fixing unit on the front side FR of the right side upper rail 14R. Accordingly, the strain detection elements at the positions symmetrical in the left-right direction of the first to fourth strain detection elements SG1 to SG4 of the strain detection element unit SU arranged in the front side end portion of the strain body 20 arranged on the front side FL of the left side upper rail 14L and the first to fourth strain detection elements SG1 to SG4 of the strain detection element unit SU arranged in the front side end portion of the strain body 20 arranged on the front side FR of the right side upper rail 14R can cancel the strain errors generated on the left and right sides FL and FR on the front side.

The first end portion (second lower bracket 21b) of the strain body 20 is arranged to be the back side end portion of the strain body 20 in the strain body 20 that is fixed to the mounting surface 18 which is arranged in the fixing unit on the back side RL of the left side upper rail 14L, and the first end portion (second lower bracket 21b) of the strain body 20 is arranged to be the back side end portion of the strain body 20 in the strain body 20 that is fixed to the mounting surface 18 which is arranged in the fixing unit on the back side RR of the right side upper rail 14R. Accordingly, of the first to fourth strain detection elements SG1 to SG4 of the strain detection element unit SU arranged in the back side end portion of the strain body 20 arranged on the back side RL of the left side upper rail 14L and the first to fourth strain detection elements SG1 to SG4 of the strain detection element unit SU arranged in the back side end portion of the strain body 20 arranged on the back side RR of the right side upper rail 14R, the first to fourth strain detection elements SG1 to SG4 that are at the positions symmetrical in the left-right direction can cancel the strain errors generated on the left and right sides RL and RR on the back side.

The first end portion (first lower bracket 21a) of the strain body 20 is arranged to be the front side end portion of the strain body 20 in the strain body 20 arranged in the fixing unit on the front side FL of the left side upper rail 14L, and the first end portion (second lower bracket 21b) of the strain body 20 is arranged to be the back side end portion of the strain body 20 in the strain body 20 arranged in the fixing unit on the back side RL of the left side upper rail 14L. Accordingly, of the first to fourth strain detection elements SG1 to SG4 of the strain detection element unit SU arranged in the front side end portion of the strain body 20 arranged on the front side FL of the left side upper rail 14L and the first to fourth strain detection elements SG1 to SG4 of the strain detection element unit SU arranged in the back side end portion of the strain body 20 arranged on the back side RL of the left side upper rail 14L, the first to fourth strain detection elements SG1 to SG4 that are at the positions symmetrical in the front-back direction can cancel the strain errors generated on the front and back sides FL and RL on the left side.

The first end portion (first lower bracket 21*a*) of the strain body 20 is arranged to be the front side end portion of the strain body 20 in the strain body 20 arranged in the fixing unit on the front side FR of the right side upper rail 14R, and the first end portion (second lower bracket 21*b*) of the strain body 20 is arranged to be the back side end portion of the strain body 20 in the strain body 20 arranged in the fixing unit on the back side RR of the right side upper rail 14R. Accordingly, of the first to fourth strain detection elements SG1 to SG4 of the strain detection element unit SU arranged in the front side end portion of the strain body 20 arranged on the front side FR of the right side upper rail 14R and the first to fourth strain detection elements SG1 to SG4 of the strain detection element unit SU arranged in the back side end portion of the strain body 20 arranged on the back side RR of the right side upper rail 14R, the strain detection elements that are at the positions symmetrical in the front-back direction can cancel the strain errors generated on the front and back sides FR and RR on the right side.

In this manner, the strain error can be cancelled even in a state where the strain error caused by the relative angular displacement directed for twist about the central axis OW extending in the left-right direction and the strain error caused by the relative angular displacement caused by the seating load, for which the seat frame 17 is directed to collapse inside, work in the front-back and left-right directions in the seat cushion 11 between the upper rails 14L and 14R and the seat frame 17.

Figure 31:
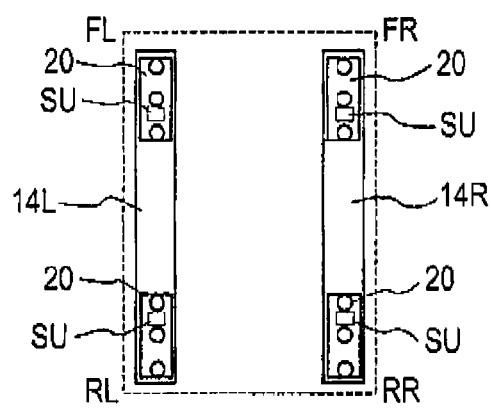
FIG. 31 is a diagram illustrating another example in which the weight detection sensor is arranged at four sites.
Figure 32:
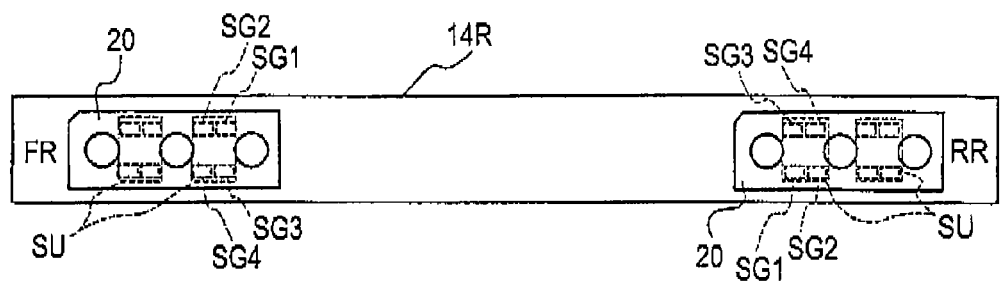
FIG. 32 is a diagram illustrating an arrangement of a weight detection sensor according to an example of the related art.
Figure 32:
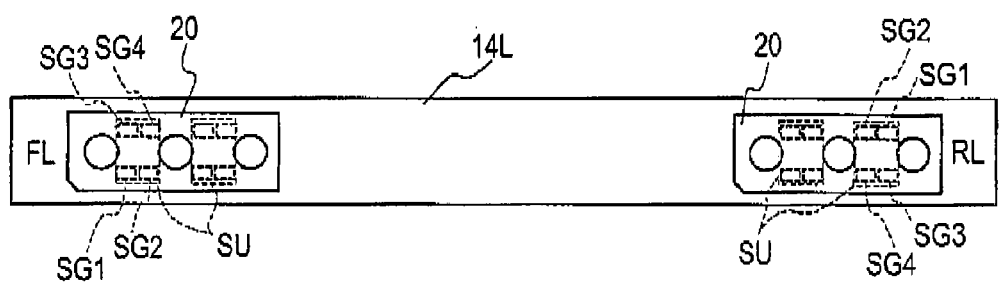

In this embodiment, the strain detection element units SU are arranged at the front ends of the strain bodies 20 on the front sides of the weight detection sensors 10 arranged in the left-right direction and are arranged at the back ends of the strain bodies on the back sides of the weight detection sensors 10 arranged in the left-right direction. However, the arrangement is not limited thereto but, for example, as illustrated in FIG. 31, the weight detection sensors 10 may be arranged on the front side FL and the back side RL of the left side upper rail 14L and on the front side FR and the back side RR of the right side upper rail 14R and the strain detection element units SU may be arranged at the back ends of the strain bodies 20 on the front sides of the weight detection sensors 10 arranged in the left-right direction and at the front ends of the strain bodies 20 on the back sides of the weight detection sensors 10 arranged in the left-right direction. Even in this embodiment, the strain detection element units SU are arranged at the positions symmetrical in the front-back and left-right directions. Accordingly, the corresponding strain detection elements (SG1 to SG4) generate the strain errors in the opposite directions between the strain detection element units SU at the positions symmetrical in the front-back and left-right directions. The strain errors are cancelled when the detected strains are added, and thus the load of the passenger can be detected with high accuracy.

In this embodiment, the first strain detection element SG1 and the second strain detection element SG2 are arranged on the same side about the front-back direction center line FRL and the third strain detection element SG3 and the fourth strain detection element SG4 are arranged on the opposite sides about the front-back direction center line FRL with respect to the first strain detection element SG1 and the second strain detection element SG2. However, the arrangement is not limited thereto but, for example, the first strain detection element SG1 and the second strain detection element SG2 may be arranged on the opposite sides about the front-back direction center line FRL, and the third strain detection element SG3 and the fourth strain detection element SG4 may be arranged on the opposite sides about the front-back direction center line FRL.

In addition, four different types of the strain detection elements have been described in the above-described embodiments so as to clarify the relationship between the first to fourth strain detection elements SG1 to SG4 corresponding to each other when the strain detection element units SU are at the symmetrical positions. However, the types thereof are not limited thereto but, for example, all of the strain detection elements may be of the same type, the first strain detection element SG1 and the third strain detection element SG3 may be of the same type, or the second strain detection element SG2 and the fourth strain detection element SG4 may be of the same type.

In addition, the first to fourth strain detection elements SG1 to SG4 are adhered to a lower surface side outer surface of the strain body 20 in the above-described embodiment. However, the place is not limited thereto but, for example, each of the first to fourth strain detection elements SG1 to SG4 may be adhered to an upper surface side outer surface of the strain body 20.

In addition, the connection member 23 is fixed to the seat frame 17 and the first and second lower brackets 21*a* and 21*b* are fixed to the upper rail 14L during the assembly of the strain body 20 in the above-described embodiment. However, the structure is not limited thereto but, for example, the connection member may be fixed to the upper rail and the first and second lower brackets may be fixed to the seat frame.

The specific configuration of the above-described embodiments is an example disclosed here, and various aspects not limited to the specific configuration can be adopted without departing from the scope thereof.

A first aspect of this disclosure is directed to a weight detection sensor for a vehicle seat apparatus disposed in a fixing unit that fixes a seat side fixing member which fixes a vehicle seat to a floor side fixed member which is fixed to a vehicle floor at four front, back, left, and right sites of the vehicle seat and measuring a load of a passenger sitting in the vehicle seat, including a strain body that is fixed to both end portions of a mounting surface formed on one of the floor side fixed member and the seat side fixing member and arranged in the fixing unit on a front side and a back side of the vehicle seat at a predetermined distance from the mounting surface, the strain body extending in a front-back direction of the vehicle seat, a connection member that is fixed to a central portion of the strain body in a vertical direction and is fixed to the other one of the floor side fixed member and the seat side fixing member, a strain detection element unit that includes a first strain detection element and a third strain detection element arranged on opposite sides across a front-back direction center line of the strain body at positions where a compressive strain is generated on an outer surface of the strain body between a first end portion and the central portion of the strain body when a weight of the passenger is applied, and a second strain detection element and a fourth strain detection element arranged on opposite sides across the front-back direction center line of the strain body at positions where a tensile strain is generated on the outer surface of the strain body between the first end portion and the central portion of the strain body when the weight of the passenger is applied, and a Wheatstone bridge circuit where the first strain detection element and the third strain detection element are arranged on sides facing each other and the second strain detection element and the fourth strain detection element are arranged on sides facing each other, each of the strain detection elements being a variable resistor, in which the strain detection element units are arranged in a pair in at least a front and a back or a left and a right of the vehicle seat and the first end portions forming the pair are arranged at symmetrical positions in the directions forming the pair.

A second aspect of this disclosure is directed to the weight detection sensor according to the first aspect, wherein the first end portion of the strain body that is fixed to the mounting surface arranged in the fixing unit on the front side on at least one of a left side and a right side of the vehicle seat may be arranged to be one of an end portion on the front side of the strain body and an end portion on the back side of the strain body, and the first end portion of the strain body that is fixed to the mounting surface arranged in the fixing unit on the back side on at least one of the left side and the right side of the vehicle seat may be arranged to be the other one of the end portion on the front side of the strain body and the end portion on the back side of the strain body.

A third aspect of this disclosure is directed to the weight detection sensor according to the first aspect, wherein the first end portion of the strain body that is fixed to the mounting surface arranged in the fixing unit on a left side on both of the front side and the back side of the vehicle seat may be arranged to be one of an end portion on the front side of the strain body and an end portion on the back side of the strain body, the first end portion of the strain body that is fixed to the mounting surface arranged in the fixing unit on a right side on both of the front side and the back side of the vehicle seat may be arranged to be one of an end portion on the front side of the strain body and an end portion on the back side of the strain body, and the first end portion of the strain body that is arranged in the fixing unit on the left side and the first end portion of the strain body that is arranged in the fixing unit on the right side may be arranged at positions symmetrical in a left-right direction.

A fourth aspect of this disclosure is directed to the weight detection sensor according to the first aspect, wherein the first end portion of the strain body that is fixed to the mounting surface arranged in the fixing unit on the left side on the front side of the vehicle seat may be arranged to be one of the end portion on the front side of the strain body and the end portion on the back side of the strain body, the first end portion of the strain body that is fixed to the mounting surface arranged in the fixing unit on the left side on the back side of the vehicle seat may be arranged to be the other one of the end portion on the front side of the strain body and the end portion on the back side of the strain body, the first end portion of the strain body that is fixed to the mounting surface arranged in the fixing unit on the right side on the front side of the vehicle seat may be arranged to be one of the end portion on the front side of the strain body and the end portion on the back side of the strain body, and the first end portion of the strain body that is fixed to the mounting surface arranged in the fixing unit on the right side on the back side of the vehicle seat may be arranged to be the other one of the end portion on the front side of the strain body and the end portion on the back side of the strain body.

A fifth aspect of this disclosure is directed to the weight detection sensor according to the first aspect, wherein the first end portion of the strain body that is fixed to the mounting surface arranged in the fixing unit on a left side on the back side of the vehicle seat may be arranged to be one of the end portion on the front side of the strain body and the end portion on the back side of the strain body, the first end portion of the strain body that is fixed to the mounting surface arranged in the fixing unit on a right side on the back side of the vehicle seat may be arranged to be one of the end portion on the front side of the strain body and the end portion on the back side of the strain body, and the first end portion of the strain body that is arranged in the fixing unit on the left side and the first end portion of the strain body that is arranged in the fixing unit on the right side may be arranged at positions symmetrical in a left-right direction.

According to the first aspect of this disclosure, the first strain detection element and the third strain detection element are arranged at the position where the compressive strain is generated between the one first end portion (first end portion on the front side) of the strain body on the mounting surface of the fixing unit on the front side and the central portion and the second strain detection element and the fourth strain detection element are arranged at the position where the tensile strain is generated in the strain detection element units when the weight of the passenger is applied, and the first strain detection element and the third strain detection element are arranged at the position where the compressive strain is generated between the other first end portion (first end portion on the back side) of the strain body on the mounting surface of the fixing unit on the back side and the central portion and the second strain detection element and the fourth strain detection element are arranged at the position where the tensile strain is generated. The strain detection element units form a pair in at least one of the front-back and left-right directions of the vehicle seat, and the first end portions forming the pair are arranged at the symmetrical positions.

Since the strain detection element units are arranged in pair in at least one of the front-back and left-right directions of the vehicle and are arranged at the symmetrical positions, the corresponding strain detection elements of the strain bodies at the symmetrical positions (for example, the first strain detection elements or the third strain detection elements corresponding to the first strain detection elements) generate the strain errors in the opposite directions when the relative angular displacement directed for the collapse inside of the seat side fixing member extending in the front-back direction with respect to the floor side fixed member works or when the relative angular displacement directed for the twist in the opposite directions works in one direction about the central axis extending in the left-right direction between the seat side fixing member and the floor side fixed member. In this manner, the strain errors can be cancelled when the detected strains are added.

For example, the hip point to which the weight of the passenger is applied is separated from the position of the floor side fixed member where the sensor substrate is arranged in a case where the passenger sits in the seat, and thus the load error for the collapse directed inside in the vehicle width direction is generated in each of the sensor substrates by the bending of the seat side fixing member which extends in the left-right and horizontal directions. Even in this case, a strain force for the collapse inside in the vehicle width direction is added to the strain detection elements (for example, the first strain detection elements on the right side) arranged on the right side of the strain detection element unit and the strain detection elements (for example, the first strain detection elements on the left side) arranged on the left side that are at the symmetrical positions if the strain detection element units are arranged in pair in the left and the right of the vehicle and at the symmetrical positions, and thus the strain error is generated in the opposite directions in the corresponding strain detection elements of the left and right strain detection element units. For example, when the first strain detection element on the right side generating the compressive strain by the load of the passenger in the up-down direction generates a further compressive strain by the load error, the first strain detection element on the left side generates the tensile strain to reduce the compressive strain, and thus the strain errors generated in the left and right strain detection elements can be cancelled.

In addition, the relative angular displacement is in the opposite directions in the left and the right of the vehicle seat between the seat side fixing member and the floor side fixed member when a large force is generated in the vehicle due to the sudden braking or the like and the relative angular displacement generating the load error directed for the twist in the opposite directions works in one direction between the seat side fixing member and the floor side fixed member about the central axis extending in the left-right direction. Accordingly, regarding the strain detection element units that are arranged at the symmetrical positions in the left and the right, the strain detection elements arranged on the right side and the strain detection elements arranged on the left side that correspond to each other (for example, the first strain detection elements) generate the strain error in the opposite directions, and thus the strain error can be cancelled as described above. In addition, regarding the strain detection element units that are arranged at the symmetrical positions in the front and the back of the vehicle seat, the strain detection element arranged on the front side and the strain detection element arranged on the back side that correspond to each other (for example, the first strain detection elements) generate the strain error in the opposite directions, and thus the strain error can be cancelled as described above.

According to the second aspect of this disclosure, the first end portion of the strain body that is fixed to the mounting surface arranged in the fixing unit on the front side on at least one of the left side and the right side of the vehicle seat is arranged to be one of an end portion on the front side of the strain body and an end portion on the back side of the strain body, and the first end portion of the strain body that is fixed to the mounting surface arranged in the fixing unit on the back side on at least one of the left side and the right side of the vehicle seat is arranged to be the other one of the end portion on the front side of the strain body and the end portion on the back side of the strain body.

For example, when a strain detection element unit is arranged in the end portion (first end portion) on the front side of the strain body in the fixing unit on the front side on the left side of the vehicle seat, a strain detection element unit is arranged in the end portion (first end portion) on the back side of the strain body in the fixing unit on the back side on the left side of the vehicle seat. When a large force is generated in the vehicle due to the sudden braking or the like and the relative angular displacement generating the load error directed for the twist in the opposite directions works in one direction between the seat side fixing member and the floor side fixed member about the central axis extending in the left-right direction, the relative angular displacement working between the seat side fixing member on the front side and the floor side fixed member on the front side and the relative angular displacement working between the seat side fixing member on the back side and the floor side fixed member on the back side have the same direction on, for example, the left side of the vehicle seat. However, the strains in the opposite directions are generated in the first end portion on the front side of the strain body and the first end portion on the back side of the strain body, and thus the strain detection element (for example, the first strain detection element) of the strain detection element unit arranged in the first end portion on the front side and the strain detection element (first strain detection element) of the strain detection element unit arranged in the first end portion on the back side that corresponds to the strain detection element detect the strain errors in the opposite directions. In this manner, the front-back strain errors can be cancelled.

According to the third aspect of this disclosure, the first end portion of the strain body that is fixed to the mounting surface arranged in the fixing unit on a left side on both of the front side and the back side of the vehicle seat is arranged to be one of an end portion on the front side of the strain body and an end portion on the back side of the strain body, the first end portion of the strain body that is fixed to the mounting surface arranged in the fixing unit on a right side on both of the front side and the back side of the vehicle seat is arranged to be one of an end portion on the front side of the strain body and an end portion on the back side of the strain body, and the first end portion of the strain body arranged in the fixing unit on the left side and the first end portion of the strain body arranged in the fixing unit on the right side are arranged at positions symmetrical in a left-right direction.

Accordingly, in a case where the passenger sits in the seat and the load error for the collapse directed inside is generated in each of the sensor substrates, the strain errors in the opposite directions are generated in the strain detection elements (for example, the left and right first strain detection elements) symmetrical in the left-right direction since the strain detection elements units are arranged at the left and right symmetrical positions (for example, the first end portions on the left and right back sides) of the vehicle seat arranged in one of the end portion on the front side of the strain body and the end portion on the back side of the strain body. Accordingly, in the strain bodies arranged on both of the front side and the back side of the vehicle seat, the strain errors can be cancelled by the left and right strain detection elements.

In addition, when a large force is generated in the vehicle due to the sudden braking or the like and the load error directed for the twist in the opposite directions is generated between the seat side fixing member and the floor side fixed member about the central axis extending in the left-right direction, the relative angular displacement in the opposite left and right directions is generated in the seat side fixing member and the floor side fixed member. In this case, in the strain detection element units arranged at the left and right symmetrical positions, the corresponding strain detection elements (for example, the first strain detection element on the left side and the first strain detection element on the right side) of the strain detection element arranged on the right side and the strain detection element arranged on the left side generate the strain errors in the opposite directions, and thus the strain errors can be cancelled as described above.

According to the fourth aspect of this disclosure, the first end portion of the strain body arranged in the fixing unit on the left side on the front side of the vehicle seat is arranged to be one (for example, the end portion on the front side) of the end portion on the front side of the strain body and the end portion on the back side of the strain body, the first end portion of the strain body arranged in the fixing unit on the right side on the front side of the vehicle seat is arranged to be one (for example, the end portion on the front side) of the end portion on the front side of the strain body and the end portion on the back side of the strain body. Accordingly, the strain detection elements at the symmetrical positions of each of the strain detection elements of the strain detection element units arranged in the end portion on the front side of the strain body arranged on the left side on the front side and each of the strain detection elements of the strain detection element units arranged in the end portion on the front side of the strain body arranged on the right side on the front side can cancel the strain errors generated in the left and the right on the front side.

The first end portion of the strain body arranged in the fixing unit on the left side on the back side of the vehicle seat is arranged to be the other one (for example, the end portion on the back side) of the end portion on the front side of the strain body and the end portion on the back side of the strain body, and the first end portion of the strain body arranged in the fixing unit on the right side on the back side of the vehicle seat is arranged to be one (for example, the end portion on the back side) of the end portion on the front side of the strain body and the end portion on the back side of the strain body. Accordingly, the strain detection elements at the symmetrical positions of each of the strain detection elements of the strain detection element units arranged in the end portion on the back side of the strain body arranged on the left side on the back side and each of the strain detection elements of the strain detection element units arranged in the end portion on the back side of the strain body arranged on the left side on the back side can cancel the strain errors generated in the left and the right on the back side.

The first end portion of the strain body arranged in the fixing unit on the left side on the front side of the vehicle seat is arranged to be the end portion (for example, the end portion on the front side) on one side of the strain body and the first end portion of the strain body fixed to the mounting surface arranged in the fixing unit on the left side on the back side of the vehicle seat is arranged to be the end portion (for example, the end portion on the back side) on the other side of the strain body. Accordingly, the strain detection elements at the symmetrical positions of each of the strain detection elements of the strain detection element units arranged in the end portion on the front side of the strain body arranged on the left side on the front side and each of the strain detection elements of the strain detection element units arranged in the end portion on the back side of the strain body arranged on the left side on the back side can cancel the strain errors generated in the front and back on the left side.

The first end portion of the strain body arranged in the fixing unit on the right side on the front side of the vehicle seat is arranged to be the end portion (for example, the end portion on the front side) on the one side of the strain body and the first end portion of the strain body fixed to the mounting surface arranged in the fixing unit on the right side on the back side of the vehicle seat is arranged to be the end portion (for example, the end portion on the back side) on the other side of the strain body. Accordingly, the strain detection elements at the symmetrical positions of each of the strain detection elements of the strain detection element units arranged in the end portion on the front side of the strain body arranged on the right side on the front side and each of the strain detection elements of the strain detection element units arranged in the end portion on the back side of the strain body arranged on the right side on the back side can cancel the strain errors generated in the front and back on the right side.

In this manner, the strain detection element units SU are arranged at the four left, right, front, and back symmetrical positions in the vehicle seat, and thus the strain error can be cancelled even in a state where the strain error caused by the relative angular displacement directed for the twist in the opposite directions about the central axis in the left-right direction and the strain error caused by the relative angular displacement caused by the seating load, for which the seat side fixing member is directed to collapse inside, work on the strain detection elements in the front, back, left, and right of the vehicle seat between the floor side fixed member and the seat side fixing member.

According to the fifth aspect of this disclosure, the first end portion of the strain body fixed to the mounting surface arranged in the fixing unit on a left side on the back side of the vehicle seat is arranged to be one of the end portion on the front side of the strain body and the end portion on the back side of the strain body, and the first end portion of the strain body fixed to the mounting surface arranged in the fixing unit on a right side on the back side of the vehicle seat is arranged to be one of the end portion on the front side of the strain body and the end portion on the back side of the strain body.

Accordingly, the strain detection elements at the symmetrical positions of each of the strain detection elements of the strain detection element units arranged in the end portion on either the front side or the back side of the strain body arranged on the left side on the back side and each of the strain detection elements of the strain detection element units arranged in the end portion on either the front side or the back side of the strain body arranged on the left side on the back side can cancel the strain errors generated in the left and right on the back side of the vehicle seat. Accordingly, the strain detection element units can be configured to be arranged at only two sites on the back side of the vehicle seat such that the manufacturing costs can be reduced.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A weight detection sensor for a vehicle seat apparatus disposed in a fixing unit that fixes a seat side fixing member which fixes a vehicle seat to a floor side fixed member which is fixed to a vehicle floor at four front, back, left, and right sides of the vehicle seat and measuring a load of a passenger sitting in the vehicle seat, comprising:

a strain body that is fixed to both end portions of a mounting surface formed on one of the floor side fixed member and the seat side fixing member and arranged in the fixing unit on a front side and a back side of the vehicle seat at a predetermined distance from the mounting surface, the strain body extending in a front-back direction of the vehicle seat;

a connection member that is fixed to a central portion of the strain body in a vertical direction and is fixed to the other one of the floor side fixed member and the seat side fixing member;

a strain detection element unit that includes a first strain detection element and a third strain detection element arranged on opposite sides across a front-back direction center line of the strain body at positions where a compressive strain is generated on an outer surface of the strain body between a first end portion and the central portion of the strain body when a weight of the passenger is applied, and a second strain detection element and a fourth strain detection element arranged on opposite sides across the front-back direction center line of the strain body at positions where a tensile strain is generated on the outer surface of the strain body between the first end portion and the central portion of the strain body when the weight of the passenger is applied, the front-back direction center line of the strain body extending between the end portions of the mounting surface; and a Wheatstone bridge circuit where the first strain detection element and the third strain detection element are arranged on sides facing each other and the second strain detection element and the fourth strain detection element are arranged on sides facing each other, each of the strain detection elements being a variable resistor, wherein the strain detection element units are arranged in a pair in at least a front and a back or a left and a right of the vehicle seat and the first end portions forming the pair are arranged at symmetrical positions in the directions forming the pair.

2. The weight detection sensor for the vehicle seat apparatus according to claim 1, wherein the first end portion of the strain body that is fixed to the mounting surface arranged in the fixing unit on the front side on at least one of a left side and a right side of the vehicle seat is arranged to be one of an end portion on the front side of the strain body and an end portion on the back side of the strain body, and the first end portion of the strain body that is fixed to the mounting surface arranged in the fixing unit on the back side on at least one of the left side and the right side of the vehicle seat is arranged to be the other one of the end portion on the front side of the strain body and the end portion on the back side of the strain body.

3. The weight detection sensor for the vehicle seat apparatus according to claim 1, wherein the first end portion of the strain body that is fixed to the mounting surface arranged in the fixing unit on a left side on both of the front side and the back side of the vehicle seat is arranged to be one of an end portion on the front side of the strain body and an end portion on the back side of the strain body, the first end portion of the strain body that is fixed to the mounting surface arranged in the fixing unit on a right side on both of the front side and the back side of the vehicle seat is arranged to be one of an end portion on the front side of the strain body and an end portion on the back side of the strain body, and the first end portion of the strain body that is arranged in the fixing unit on the left side and the first end portion of the strain body that is arranged in the fixing unit on the right side are arranged at positions symmetrical in a left-right direction.

4. The weight detection sensor for the vehicle seat apparatus according to claim 3, wherein the first end portion of the strain body that is fixed to the mounting surface arranged in the fixing unit on the left side on the front side of the vehicle seat is arranged to be one of the end portion on the front side of the strain body and the end portion on the back side of the strain body, the first end portion of the strain body that is fixed to the mounting surface arranged in the fixing unit on the left side on the back side of the vehicle seat is arranged to be the other one of the end portion on the front side of the strain body and the end portion on the back side of the strain body, the first end portion of the strain body that is fixed to the mounting surface arranged in the fixing unit on the right side on the front side of the vehicle seat is arranged to be one of the end portion on the front side of the strain body and the end portion on the back side of the strain body, and the first end portion of the strain body that is fixed to the mounting surface arranged in the fixing unit on the right side on the back side of the vehicle seat is arranged to be the other one of the end portion on the front side of the strain body and the end portion on the back side of the strain body.

5. The weight detection sensor for the vehicle seat apparatus according to claim 1, wherein the first end portion of the strain body that is fixed to the mounting surface arranged in the fixing unit on a left side on the back side of the vehicle seat is arranged to be one of the end portion on the front side of the strain body and the end portion on the back side of the strain body, the first end portion of the strain body that is fixed to the mounting surface arranged in the fixing unit on a right side on the back side of the vehicle seat is arranged to be one of the end portion on the front side of the strain body and the end portion on the back side of the strain body, and the first end portion of the strain body that is arranged in the fixing unit on the left side and the first end portion of the strain body arranged in the fixing unit on the right side are arranged at positions symmetrical in a left-right direction.

6. The weight detection sensor for the vehicle seat apparatus according to claim 1, wherein the strain body includes two fixing holes one at each of the end portions of the strain body and the front-back direction center line of the strain body intersects centers of the two fixing holes.

* * * * *